United States Patent
Ishihara et al.

(10) Patent No.: US 6,502,024 B2
(45) Date of Patent: Dec. 31, 2002

(54) ELECTRIC POWER STEERING APPARATUS

(75) Inventors: Atsushi Ishihara, Kashiwara (JP); Hideki Jonokuchi, Kashihara (JP); Hirohide Inayama, Yamatokoriyama (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/810,777

(22) Filed: Mar. 16, 2001

(65) Prior Publication Data

US 2001/0023383 A1 Sep. 20, 2001

(30) Foreign Application Priority Data

Mar. 17, 2000 (JP) ........................... 2000-076928

(51) Int. Cl.[7] .................. B62D 5/04; B62D 5/00; H02P 7/00
(52) U.S. Cl. ............... 701/41; 180/443; 180/414; 318/432
(58) Field of Search ................... 701/41; 318/807, 318/432, 434, 139; 180/443, 400, 412, 446, 444

(56) References Cited

U.S. PATENT DOCUMENTS

| | | | | |
|---|---|---|---|---|
| 4,751,978 A | * | 6/1988 | Drutchas | 180/142 |
| 4,875,539 A | * | 10/1989 | Abukawa et al. | 180/79.1 |
| 5,202,830 A | * | 4/1993 | Tsurumiya et al. | 364/424.05 |
| 5,732,790 A | * | 3/1998 | Endo et al. | 180/444 |
| 5,758,741 A | * | 6/1998 | Tomioka | 180/446 |
| 6,052,633 A | * | 4/2000 | Fukuyama et al. | 701/41 |
| 6,246,197 B1 | * | 6/2001 | Kurishige et al. | 318/432 |
| 6,274,999 B1 | * | 8/2001 | Fujii et al. | 318/807 |

FOREIGN PATENT DOCUMENTS

| | | |
|---|---|---|
| JP | 7-052810 | 2/1995 |
| JP | 7-076280 | 3/1995 |
| JP | 8-127355 | 5/1996 |

OTHER PUBLICATIONS

English Translation of Abstract of Japanese Patent No. 8–127355.
English Translation of Abstract of Japanese Patent No. 7–052810.
English Translation of Abstract of Japanese Patent No. 7–076280.

* cited by examiner

*Primary Examiner*—Tan Nguyen
*Assistant Examiner*—Dalena Tran
(74) *Attorney, Agent, or Firm*—Darby & Darby

(57) ABSTRACT

An electric power steering apparatus being provided with: a torque sensor 10 for detecting a steering torque applied to a steering wheel (not shown); and a steering assisting motor 24 driven by a drive circuit 13 to which the voltage of a mounted battery P is applied, in which the drive circuit 13 rotates the motor 24 in accordance with a motor current instruction value determined based on the steering torque detected by the torque sensor 10, is further provided with: judging means 12 for judging whether the motor current instruction value is higher than a first threshold value or not; boosting instruction outputting means 12 for, when the judging means 12 judges that the motor current instruction value is higher, outputting a boosting instruction for boosting the voltage of the mounted battery P; and a boosting circuit 8d for boosting the voltage of the mounted battery in response to the outputted boosting instruction. Even when the voltage of the mounted battery P fluctuates, a voltage from which a stable steering assisting force is always obtained can be supplied to the steering assisting motor, so that the steering assisting motor can be reduced in size.

20 Claims, 13 Drawing Sheets

ELECTRIC POWER STEERING APPARATUS

BACKGROUND OF THE INVENTION

The present invention relates to an electric power steering apparatus in which a motor current instruction value representative of the value of the current to flow through a motor is determined based on the steering torque detected by a torque sensor and the motor is driven in accordance with the determined motor current instruction value.

An electric power steering apparatus mounted on a vehicle assists the steering power of the vehicle with a motor, and is structured so that a steering mechanism to which the steering wheel is coupled through a steering shaft is provided with a torque sensor that detects the steering torque applied to the steering wheel and a motor that assists the operation of the steering mechanism and the motor is driven in accordance with the steering torque detected by the torque sensor to thereby reduce the operation force on the steering wheel.

In a case where the steering assisting motor used in an electric power steering apparatus is, for example, a brushless motor, the brushless motor has a characteristic such that although the number of rotation increases as the applied voltage increases, the maximum value of the rotation torque determined based on the current flow is the same irrespective of the voltage as shown in FIG. 1, and therefore, the higher the applied voltage is, the faster the motor can rotate at the same rotation torque.

The steering assisting motor is driven by a mounted battery, and fluctuations in the voltage of the mounted battery are assumed to be, for example, 10 to 16 V. The steering assisting motor, which is designed so as to suit the assumed minimum voltage (10 V) in consideration of the fluctuations in the voltage of the mounted battery, is a low-voltage and large-current motor, and has a size larger than a motor designed for a higher voltage.

BRIEF SUMMARY OF THE INVENTION

The present invention is made in view of the above-described circumstances, and an object thereof is to provide an electric power steering apparatus in which a voltage from which a stable steering assisting force is always obtained can be supplied to the steering assisting motor even when the voltage of the mounted battery fluctuates, and the steering assisting motor can be reduced in size.

An electric power steering apparatus according to a first invention is provided with: a torque sensor for detecting a steering torque applied to a steering wheel; and a steering assisting motor driven by a drive circuit to which a voltage of a mounted battery is applied, in which a motor current instruction value representative of a value of current to flow through the motor is determined based on the steering torque detected by the torque sensor, the drive circuit rotates the motor in accordance with the determined motor current instruction value, and a steering power is assisted by a rotation torque outputted by the motor, is characterized by comprising: judging means for judging whether the motor current instruction value is higher than a first threshold value or not; boosting instruction outputting means for, when the judging means judges that the motor current instruction value is higher, outputting a boosting instruction for boosting the voltage of the mounted battery; and a boosting circuit for boosting the voltage of the mounted battery in response to the boosting instruction outputted by the boosting instruction outputting means, wherein the voltage boosted by the boosting circuit is applied to the drive circuit.

In this electric power steering apparatus of the first invention, the torque sensor detects the steering torque applied to the steering wheel, and the steering assisting motor is driven by the drive circuit to which the voltage of the mounted battery is applied. The motor current instruction value representative of the value of the current to be flown through the motor is determined based on the steering torque detected by the torque sensor, and the drive circuit rotates the motor based on the determined motor current instruction value. The judging means judges whether the motor current instruction value is higher than the first threshold value or not, and when the judging means judges that the motor current instruction value is higher, the boosting instruction outputting means outputs the boosting instruction for boosting the voltage of the mounted battery. The boosting circuit boosts the voltage of the mounted battery in response to the boosting instruction outputted by the boosting instruction outputting means, and the voltage boosted by the boosting circuit is applied to the drive circuit.

According to this structure, a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a second invention is characterized by further comprising in addition to the first invention: judging means for judging whether or not the motor current instruction value is lower than a second threshold value that is lower than the first threshold value during the boosting circuit boosts the voltage of the mounted battery; and stepping down instruction outputting means for, when the judging means judges that the motor current instruction value is lower, outputting a stepping down instruction for stepping down the voltage, wherein the boosting circuit stops the boosting of the voltage of the mounted battery in response to the stepping down instruction outputted by the stepping down instruction outputting means.

In this electric power steering apparatus of the second invention, during the boosting circuit boosts the voltage of the mounted battery, the judging means judges whether or not the motor current instruction value is lower than the second threshold value that is lower than the first threshold value. When the judging means judges that the motor current instruction value is lower, the stepping down instruction outputting means outputs the stepping down instruction for stepping down the voltage. The boosting circuit stops the boosting in response to the outputted stepping down instruction. According to this structure, when it becomes unnecessary to boost the voltage of the mounted battery applied to the drive circuit, the voltage can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

An electric power steering apparatus according to a third invention is characterized by, in addition to the first invention, further comprising calculating means for calculating the rotation torque when the judging means judges that the motor current instruction value is higher; wherein the boosting instruction outputting means outputs a boosting instruction for boosting the voltage of the mounted battery to a predetermined voltage in accordance with the rotation torque calculated by the calculating means.

In this electric power steering apparatus of the third invention, the torque sensor detects the steering torque applied to the steering wheel, and the steering assisting motor is driven by the drive circuit to which the voltage of the mounted battery is applied. The motor current instruction value representative of the value of the current to be flown through the motor is determined based on the steering torque detected by the torque sensor, the drive circuit rotates the motor based on the determined motor current instruction value, and the steering power is assisted by the rotation torque outputted by the motor. The judging means judges whether the motor current instruction value is higher than the first threshold value or not, and when the judging means judges that the motor current instruction value is higher, the calculating means calculates the rotation torque. The boosting instruction outputting means outputs the boosting instruction for boosting the voltage of the mounted battery to the predetermined voltage in accordance with the rotation torque calculated by the calculating means, and the boosting circuit boosts the voltage of the mounted battery to the predetermined voltage in response to the boosting instruction outputted by the boosting instruction outputting means. The predetermined voltage boosted by the boosting circuit is applied to the drive circuit.

According to this structure, the voltage of the mounted battery can be boosted in accordance with the rotation torque of the motor when the motor current instruction value is maximum, and a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a fourth invention is characterized by, in addition to the first invention, further comprising calculating means for, when the judging means judges that the motor current instruction value is higher, calculating a ratio of the rotation torque to a maximum rotation torque that can be outputted by the motor; wherein the boosting instruction outputting means outputs a boosting instruction for boosting the voltage of the mounted battery to a predetermined voltage in accordance with the ratio calculated by the calculating.

In this electric power steering apparatus of the fourth invention, the torque sensor detects the steering torque applied to the steering wheel, and the steering assisting motor is driven by the drive circuit to which the voltage of the mounted battery is applied. The motor current instruction value representative of the value of the current to be flown through the motor is determined based on the steering torque detected by the torque sensor, the drive circuit rotates the motor based on the determined motor current instruction value, and the steering power is assisted by the rotation torque outputted by the motor. The judging means judges whether the motor current instruction value is higher than the first threshold value or not, and when the judging means judges that the motor current instruction value is higher, the calculating means calculates the ratio of the rotation torque to the maximum rotation torque that can be outputted by the motor. The boosting instruction outputting means outputs the boosting instruction for boosting the voltage of the mounted battery to the predetermined voltage in accordance with the ratio calculated by the calculating means, and the boosting circuit boosts the voltage of the mounted battery to the predetermined voltage in response to the boosting instruction outputted by the outputting means. The predetermined voltage boosted by the boosting circuit is applied to the drive circuit.

According to this structure, the voltage of the mounted battery can be boosted in accordance with the rotation torque of the motor when the motor current instruction value is maximum, and a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a fifth invention is characterized by further comprising in addition to the third or fourth invention: judging means for judging whether or not the motor current instruction value is lower than a second threshold value that is lower than the first threshold value during the boosting circuit boosts the voltage of the mounted battery to the predetermined voltage; and stepping down instruction outputting means for, when the judging means judges that the motor current instruction value is lower, outputting a stepping down instruction for stepping down the voltage, wherein the boosting circuit stops the boosting of the voltage of the mounted battery to the predetermined voltage in response to the stepping down instruction outputted by the stepping down instruction outputting means.

In the electric power steering apparatus according to the fifth invention, the judging means judges whether the motor current instruction value is lower than the predetermined value or not during the boosting circuit boosts the voltage of the mounted battery to the predetermined voltage, and the stepping down instruction outputting means outputs the stepping down instruction for stepping down the voltage when the judging means judges that the motor current instruction value is lower. The boosting circuit stops the boosting of the voltage of the mounted battery to the predetermined voltage in response to the stepping down instruction outputted by the stepping down instruction outputting means.

According to this structure, when it becomes unnecessary to boost the voltage of the mounted battery applied to the drive circuit, the boosted voltage of the mounted battery can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

An electric power steering apparatus according to a sixth invention is provided with: a torque sensor for detecting a steering torque applied to a steering wheel; and a steering assisting motor driven by a drive circuit to which a voltage of a mounted battery is applied, in which a motor current instruction value representative of a value of a current to be flown through the motor is determined based on the steering torque detected by the torque sensor, the drive circuit rotates the motor in accordance with the determined motor current instruction value, and a steering power is assisted by a rotation torque outputted by the motor, is characterized by comprising: a rotation number detector for detecting a number of rotations of the motor; judging means for judging whether the number of rotations detected by the rotation number detector is higher than a first threshold value or not; boosting instruction outputting means for, when the judging means judges that the number of rotations is higher, outputting a boosting instruction for boosting the voltage of the mounted battery to a predetermined voltage in accordance with the number of rotations; and a boosting circuit for boosting the voltage of the mounted battery to the predetermined voltage in response to the boosting instruction outputted by the boosting instruction outputting means, wherein the predetermined voltage boosted by the boosting circuit is applied to the drive circuit.

In this electric power steering apparatus of the sixth invention, the torque sensor detects the steering torque applied to the steering wheel, and the steering assisting motor is driven by the drive circuit to which the voltage of the mounted battery is applied. The motor current instruction value representative of the value of the current to be flown through the motor is determined based on the steering torque detected by the torque sensor, the drive circuit rotates the motor based on the determined motor current instruction value, and the steering power is assisted by the rotation torque outputted by the motor. The rotation number detector detects the number of rotations of the motor, and the judging means judges whether the number of rotations detected by the rotation number detector is higher than the first threshold value or not. When the judging means judges that the number of rotations is higher, the boosting instruction outputting means outputs the boosting instruction for boosting the voltage of the mounted battery to the predetermined voltage in accordance with the number of rotations detected by the rotation number detector. The boosting circuit boosts the voltage of the mounted battery to the predetermined voltage in response to the boosting instruction outputted by the boosting instruction outputting means, and the predetermined voltage boosted by the boosting circuit is applied to the drive circuit.

According to this structure, the voltage of the mounted battery can be boosted in accordance with the number of rotations of the motor, and a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a seventh invention is characterized by further comprising in addition to the sixth invention: first judging means for judging whether or not the number of rotations detected by the rotation number detector is lower than a second threshold value that is lower than the first threshold value during the boosting circuit boosts the voltage of the mounted battery to the predetermined voltage; and stepping down instruction outputting means for, when the first judging means judges that the number of rotations is lower, outputting a stepping down instruction for stepping down the voltage, wherein the boosting circuit stops the boosting of the voltage of the mounted battery to the predetermined voltage in response to the stepping down instruction outputted by the stepping down instruction outputting means.

In this electric power steering apparatus of the seventh invention, during the boosting circuit boosts the voltage of the mounted battery to the predetermined voltage, the first judging means judges whether or not the number of rotations detected by the rotation number detector is lower than the second threshold value that is lower than the first threshold value. When the first judging means judges that the number of rotations is lower, the stepping down instruction outputting means outputs the stepping down instruction for stepping down the voltage, and the boosting circuit stops the boosting of the voltage of the mounted battery to the predetermined voltage in response to the stepping down instruction outputted by the stepping down instruction outputting means.

According to this structure, when it becomes unnecessary to boost the voltage of the mounted battery applied to the drive circuit, the boosted voltage of the mounted battery can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

An electric power steering apparatus according to an eighth invention is characterized by further comprising in addition to the sixth or seventh invention: judging means for judging whether the motor current instruction value is higher than a third threshold value or not; and calculating means for calculating the rotation torque when the judging means judges that the motor current instruction value is higher, wherein the boosting instruction outputting means outputs a boosting instruction for boosting the voltage of the mounted battery to the predetermined voltage in accordance with the rotation torque calculated by the calculating means and the number of rotations, and the boosting circuit boosts the voltage of the mounted battery to the predetermined voltage in response to the boosting instruction outputted by the boosting instruction outputting means.

In this electric power steering apparatus of the eighth invention, the judging means judges whether the motor current instruction value is higher than the third threshold value or not, and when the judging means judges that the motor current instruction value is higher, the calculating means calculates the rotation torque. The boosting instruction outputting means outputs the boosting instruction for boosting the voltage of the mounted battery to the predetermined voltage in accordance with the rotation torque calculated by the calculating means and the number of rotations detected by the rotation number detector, and the boosting circuit boosts the voltage of the mounted battery to the predetermined voltage in response to the boosting instruction outputted by the boosting instruction outputting means.

According to this structure, the voltage of the mounted battery can be boosted in accordance with the rotation torque of the motor and the number of rotations of the motor when the motor current instruction value is maximum, and a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a ninth invention is characterized by further comprising in addition to the seventh or eighth invention: second judging means for judging whether or not the motor current instruction value is lower than a fourth threshold value that is lower than the third threshold value during the boosting circuit boosts the voltage of the mounted battery to the predetermined voltage, wherein the stepping down instruction outputting means outputs a stepping down instruction for stepping down the predetermined voltage to the voltage of the mounted battery based on results of the judgements by the second judging means and the first judging means.

In this electric power steering apparatus of the ninth invention, during the boosting circuit boosts the voltage of the mounted battery to the predetermined voltage, the second judging means judges whether or not the motor current instruction value is lower than the fourth threshold value that is lower than the third threshold value, and the stepping down instruction outputting means outputs the stepping down instruction for stepping down the predetermined voltage to the voltage of the mounted battery based on the results of the judgements by the second judging means and the first judging means.

According to this structure, when it becomes unnecessary to boost the voltage of the mounted battery applied to the drive circuit, the boosted voltage of the mounted battery can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

An electric power steering apparatus according to a tenth invention is characterized, in any one of the first through ninth invention, in that the boosting circuit has a chopper that is actuated by the boosting instruction.

In this electric power steering apparatus of the tenth invention, since the boosting circuit has the chopper that is actuated by the boosting instruction, by the boosting circuit of a simple structure, a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to an eleventh invention is characterized, in any one of the first through tenth invention, in that the motor current instruction value is a duty ratio for PWM-controlling the motor, and the drive circuit rotates the motor through the PWM control based on the duty ratio.

In this electric power steering apparatus of the eleventh invention, since the motor current instruction value is the duty ratio for PWM-controlling the motor and the drive circuit rotates the motor through the PWM control based on the duty ratio, a voltage from which a stable steering assisting force is always obtained can be supplied to the steering assisting motor even when the voltage of the mounted battery falls, so that an electric power steering apparatus in which the steering assisting motor has a reduced size is realized.

An electric power steering apparatus according to a twelfth invention is characterized by, in addition to the tenth invention, further comprising detecting means for detecting voltage applied to the drive circuit; and PWM controlling means for controlling operation of the boosting circuit based on detected value by the detecting means so as to keep the boosting voltage constant.

According to this structure, an electric power steering apparatus can be realized in which a voltage from which a stable steering assisting force is always obtained can be supplied to the steering assisting motor even when the voltage of the mounted battery fluctuates, the size of the steering assisting motor can be further reduced.

An electric power steering apparatus according to a thirteenth invention is characterized by, in addition to the tenth invention, further comprising detecting means for detecting voltage applied to the drive circuit; and PFM controlling means for controlling operation of the boosting circuit by varying operation frequency based on detected value by the detecting means so as to keep the boosting voltage constant.

In this electric power steering apparatus, the mounted battery is boosted by varying the operation frequency of the boosting circuit by the PFM circuit in order to reduce influence of noise by the boosting circuit when the boosting instruction is outputted.

In the PFM control, duty ration control is executed by varying number of pulses (pulse density; pulse width is constant) within constant time period, and boosting quantity of the voltage of the boosting chopper circuit is controlled by the duty ratio. At boosting, the voltage applied to the drive circuit is detected, and the duty ratio is controlled so as to keep the voltage applied to the drive circuit constant.

According to this structure, an electric power steering apparatus can be realized in which a voltage from which a stable steering assisting force is always obtained can be supplied to the steering assisting motor even when the voltage of the mounted battery fluctuates, the size of the steering assisting motor can be further reduced, and the electromagnetic noises caused by the boosting chopper circuit are converted into white noises, so that the influence of the electromagnetic noises can be reduced.

An electric power steering apparatus according to a fourteenth invention being provided with: a torque sensor for detecting a steering torque applied to a steering wheel; and a steering assisting motor driven by a drive circuit to which a voltage of a mounted battery is applied, in which a motor current instruction value representative of a value of a current to be flown through the motor is determined based on the steering torque detected by the torque sensor, the drive circuit rotates the motor in accordance with the determined motor current instruction value, and a steering power is assisted by a rotation torque outputted by the motor, the electric power steering apparatus being characterized by composing: judging means for judging whether an output of the motor is insufficient or not; boosting instruction outputting means for, when the judging means judges that the output of the motor is insufficient, outputting a boosting instruction for boosting the voltage of the mounted battery; a boosting circuit for boosting the voltage of the mounted battery in response to the boosting instruction outputted by the boosting instruction outputting means; detecting means for detecting that a voltage applied to the drive circuit becomes higher than a predetermined voltage; and a switching element for connecting the drive circuit and the mounted battery when the detecting means detects that the voltage applied to the drive circuit becomes higher than the predetermined voltage, wherein when the voltage applied to the drive circuit becomes higher than the predetermined voltage, a current is fed back from the drive circuit to the mounted battery.

In this electric power steering apparatus, the torque sensor detects the steering torque applied to the steering wheel, and the steering assisting motor is driven by the drive circuit to which the voltage outputted by the mounted battery is applied. The motor current instruction value representative of the value of the current to be flown through the motor is determined based on the steering torque detected by the torque sensor, and the drive circuit rotates the motor based on the determined motor current instruction value. The judging means judges whether the output of the motor is insufficient or not. When the judging means judges that the output of the motor is insufficient, the boosting instruction outputting means outputs the boosting instruction for boosting the output voltage of the mounted battery. In response to the output boosting instruction, the boosting circuit boosts the output voltage of the mounted battery. The detecting means detects that the voltage applied to the drive circuit becomes higher than the predetermined voltage, and when the detecting means detects that the voltage becomes higher than the predetermined voltage, the switching element connects the drive circuit and the mounted battery. When the voltage applied to the drive circuit is higher than the predetermined voltage, a current is fed back from the drive circuit to the mounted battery.

According to this structure, an electric power steering apparatus can be realized in which a voltage from which a stable steering assisting force is always obtained can be supplied to the steering assisting motor even when the output voltage of the mounted battery fluctuates, the size of the steering assisting motor can be further reduced, and the motor and its drive circuit are never damaged by the electric power generated by the motor.

The above and further objects and features of the invention will more fully be apparent from the following detailed description with accompanying drawings.

DETAILED DESCRIPTION OF THE INVENTION

Hereinafter, the present invention will be described with reference to the drawings showing embodiments thereof.

First Embodiment

Figure 1:
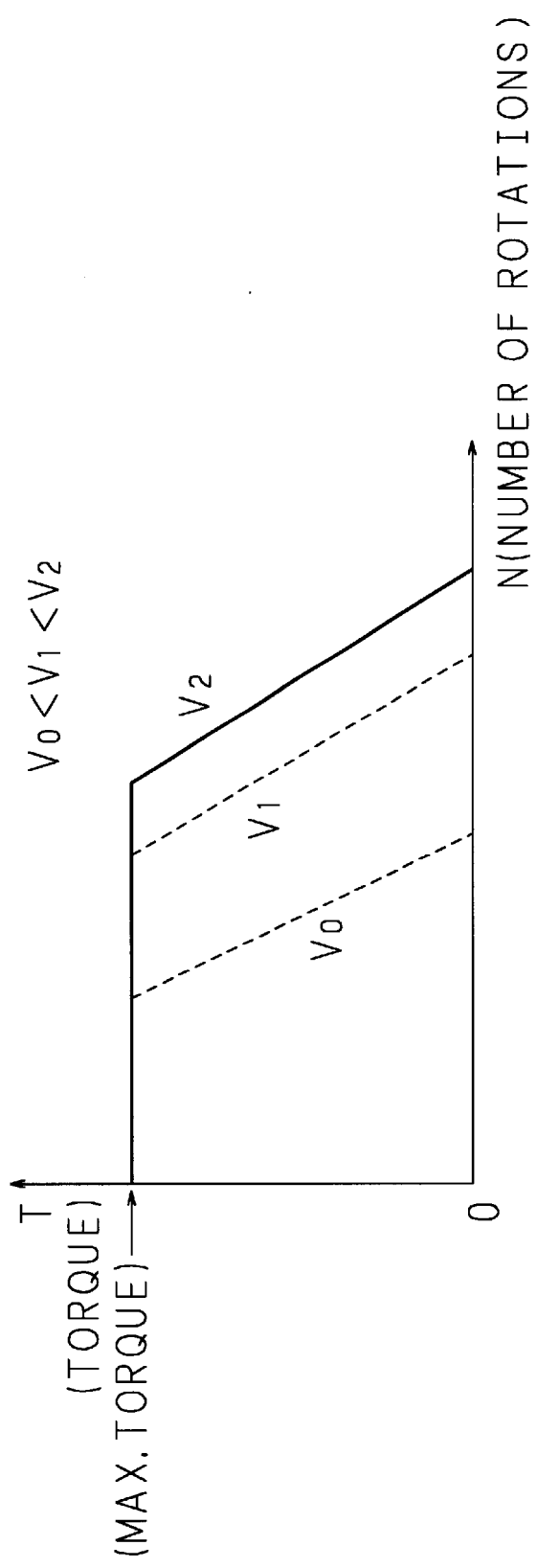
FIG. 1 is a view showing the characteristic of the brushless motor used in the electric power steering motor.
Figure 2:
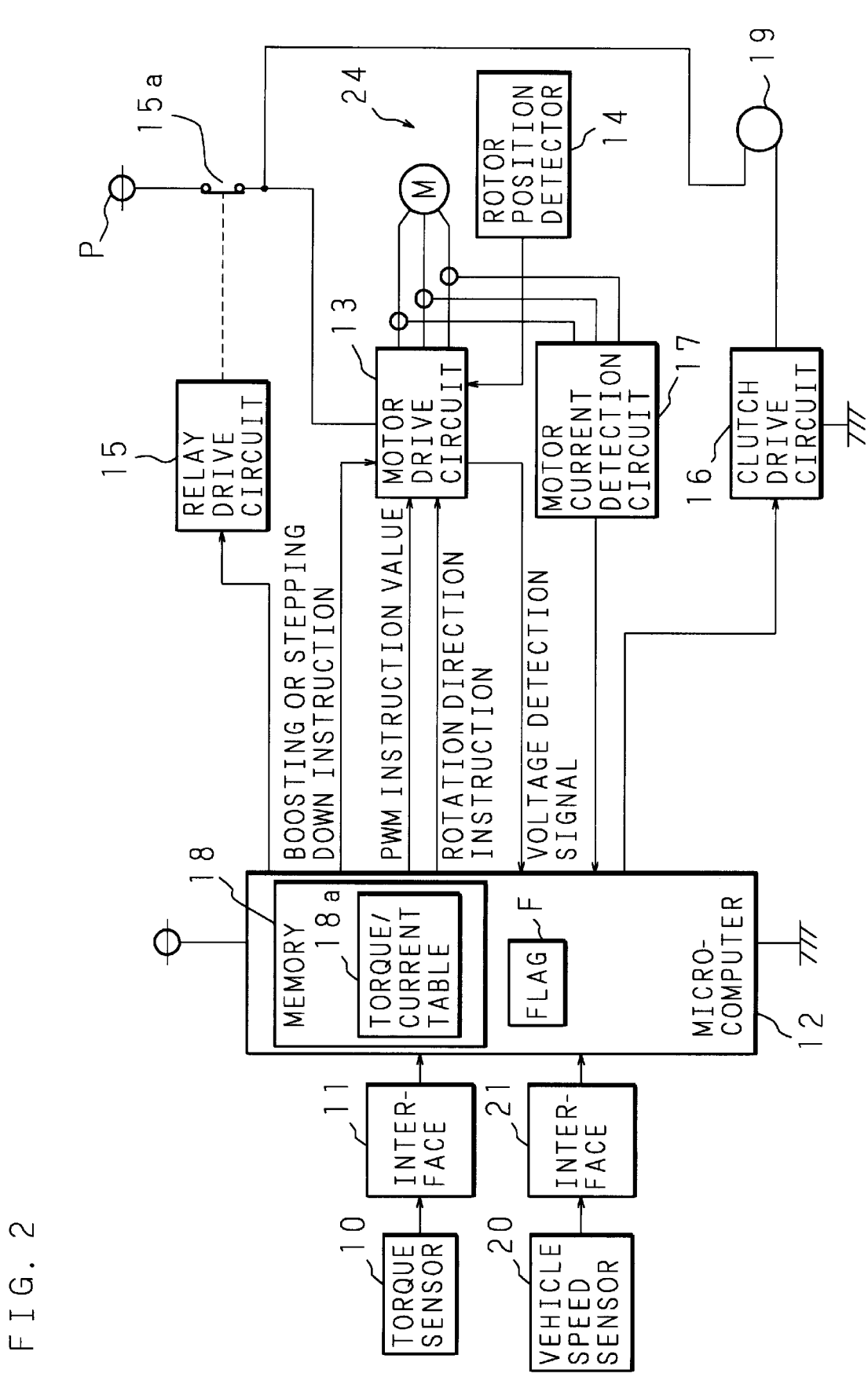
FIG. 2 is a block diagram showing the structure of an essential portion of an embodiment of the electric power steering apparatus according to the present invention.

FIG. 2 is a block diagram showing the structure of an essential portion of a first embodiment of the electric power steering apparatus according to the present invention. In this electric power steering apparatus, a torque detection signal detected and outputted by a torque sensor 10 that detects the torque applied to a steering shaft (not shown) is supplied to a microcomputer 12 through an interface circuit 11, and a vehicle speed signal detected and outputted by a vehicle speed sensor 20 that detects the vehicle speed is supplied to the microcomputer 12 through an interface circuit 21.

A relay control signal outputted from the microcomputer 12 is inputted to a relay drive circuit 15, and the relay drive circuit 15 switches a failsafe relay contact 15a between on and off states in accordance with the relay control signal.

A clutch control signal outputted from the microcomputer 12 is inputted to a clutch drive circuit 16, and the clutch drive circuit 16 turns on or off a clutch 19 in accordance with the clutch control signal. The drive power source of the clutch 19 is supplied from the motor drive circuit 13 side terminal of the failsafe relay contact 15a.

Based on the torque detection signal, the vehicle speed signal and a motor current signal described later, the microcomputer 12 produces a motor current instruction value (PWM instruction value) with reference to a torque/current table 18a in a memory 18. The produced motor current instruction value is supplied to the motor drive circuit 13. The motor drive circuit 13 is supplied with the power supply voltage of a mounted battery P through the failsafe relay contact 15a, and drives a brushless motor 24 serving as a steering assisting motor, based on the supplied motor current instruction value.

When the brushless motor 24 rotates, a rotor position detector 14 detects the rotor position of the brushless motor 24, and based on the detected rotor position signal, the motor drive circuit 13 controls the rotation of the brushless motor 24.

The motor current flowing through the brushless motor 24 is detected by a motor current detection circuit 17, and supplied to the microcomputer 12 as the motor current signal.

Figure 3:
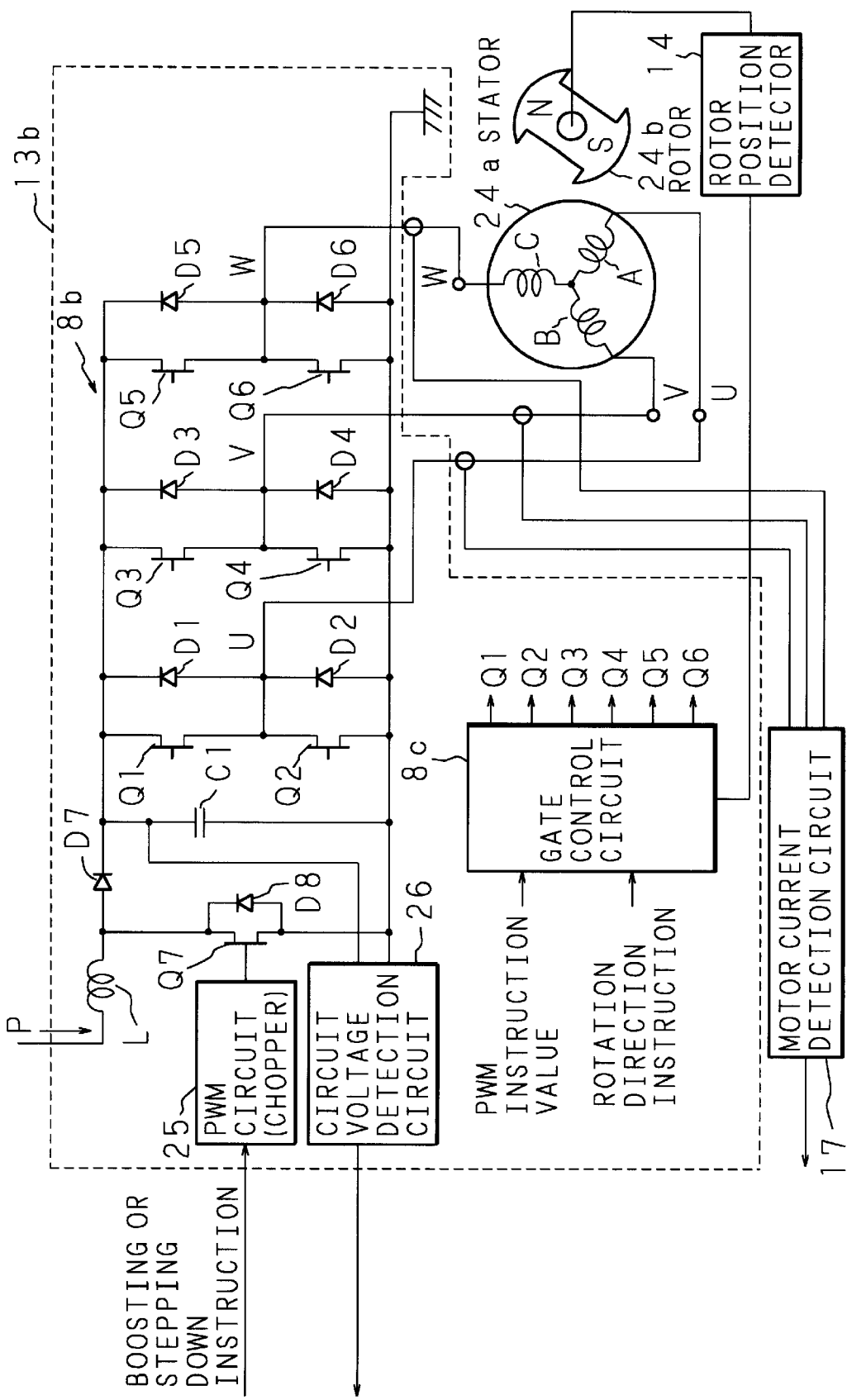
FIG. 3 is a block diagram showing the structure of the first embodiment of a brushless motor, a motor drive circuit and a motor current detection circuit.

FIG. 3 is a block diagram showing the structure of the brushless motor 24, the motor drive circuit 13 and the motor current detection circuit 17. The brushless motor 24 is provided with a stator 24a comprising star-connected coils A, B and C, a rotor 24b rotated by a rotating field generated by the coils A, B and C, and the rotor position detector (rotary encoder) 14 that detects the rotation position of the rotor 24b.

In the motor drive circuit 13, the power supply voltage of the mounted battery P is applied to the anode of a diode D7 through a coil L, and the cathode of the diode D7 is connected to the positive electrode side terminal of a switching circuit 8b. A transistor Q7 is connected between the anode of the diode D7 and a grounding terminal, and a diode D8 is parasitic between the source and the drain of the transistor Q7. A smoothing capacitor C1 is connected between the cathode of the diode D7 and the grounding terminal, and a circuit voltage detection circuit 26 that detects the voltage across the smoothing capacitor C1 is connected across the smoothing capacitor C1. The detected voltage outputted by the circuit voltage detection circuit 26 is supplied to the microcomputer 12.

To the gate of the transistor Q7, a PWM circuit 25 is connected that produces a PWM signal based on a boosting or stepping down instruction (boosting instruction, stepping down instruction) supplied from the microcomputer 12 and outputs the produced PWM signal.

The coil L, the diode D7, the smoothing capacitor C1, the transistor Q7 and the PWM circuit 25 constitute a boosting chopper circuit 8d (chopper circuit).

In the switching circuit 8b, transistors Q1 and Q2 connected in series between the positive electrode side terminal and the grounding terminal, and diodes D1 and D2 connected in series in the reverse direction are connected in parallel; transistors Q3 and Q4 connected in series and diodes D3 and D4 connected in series in the reverse direction are connected in parallel; and transistors Q5 and Q6 connected in series and diodes D5 and D6 connected in series in the reverse direction are connected in parallel.

To the common node of the transistors Q1 and Q2 and the common node of the diodes D1 and D2, the other terminal U of the star-connected coil A is connected. To the common node of the transistors Q3 and Q4 and the common node of the diodes D3 and D4, the other terminal V of the start-connected coil B is connected. To the common node of the transistors Q5 and Q6 and the common node of the diodes D5 and D6, the other terminal W of the star-connected coil C is connected.

The rotation position of the rotor 24b detected by the rotor position detector 14 is notified to a gate control circuit 8c. The gate control circuit 8c is supplied with the rotation direction and the motor current instruction value (PWM instruction value) from the microcomputer 12. The gate control circuit 8c turns on or off the gates of the transistors Q1 to Q6 in accordance with the instruction on the rotation direction and the rotation position of the rotor 24b to switch the path of the current flowing through the rotor 24a, for example, like U-V, U-W, V-W, V-U, W-U, W-V or U-V, thereby generating a rotating field.

The rotor 24b is a permanent magnet, and rotates by receiving a rotation force from the rotating field. The gate control circuit 8c also PWM (Pulse Width Modulation)-controls the On/Off of the transistors Q1 to Q6 in accordance with the motor current instruction value to thereby increase or decrease the rotation torque of the brushless motor 24.

The diodes D1 to D6 are provided for absorbing noises caused by the On/Off of the transistors Q1 to Q6.

The motor current detection circuit 17 detects the currents flowing through the terminals U, V and W of the brushless motor 24, adds the detected currents, and supplies the sum to the microcomputer 12 as the motor current signal.

Figure 4:
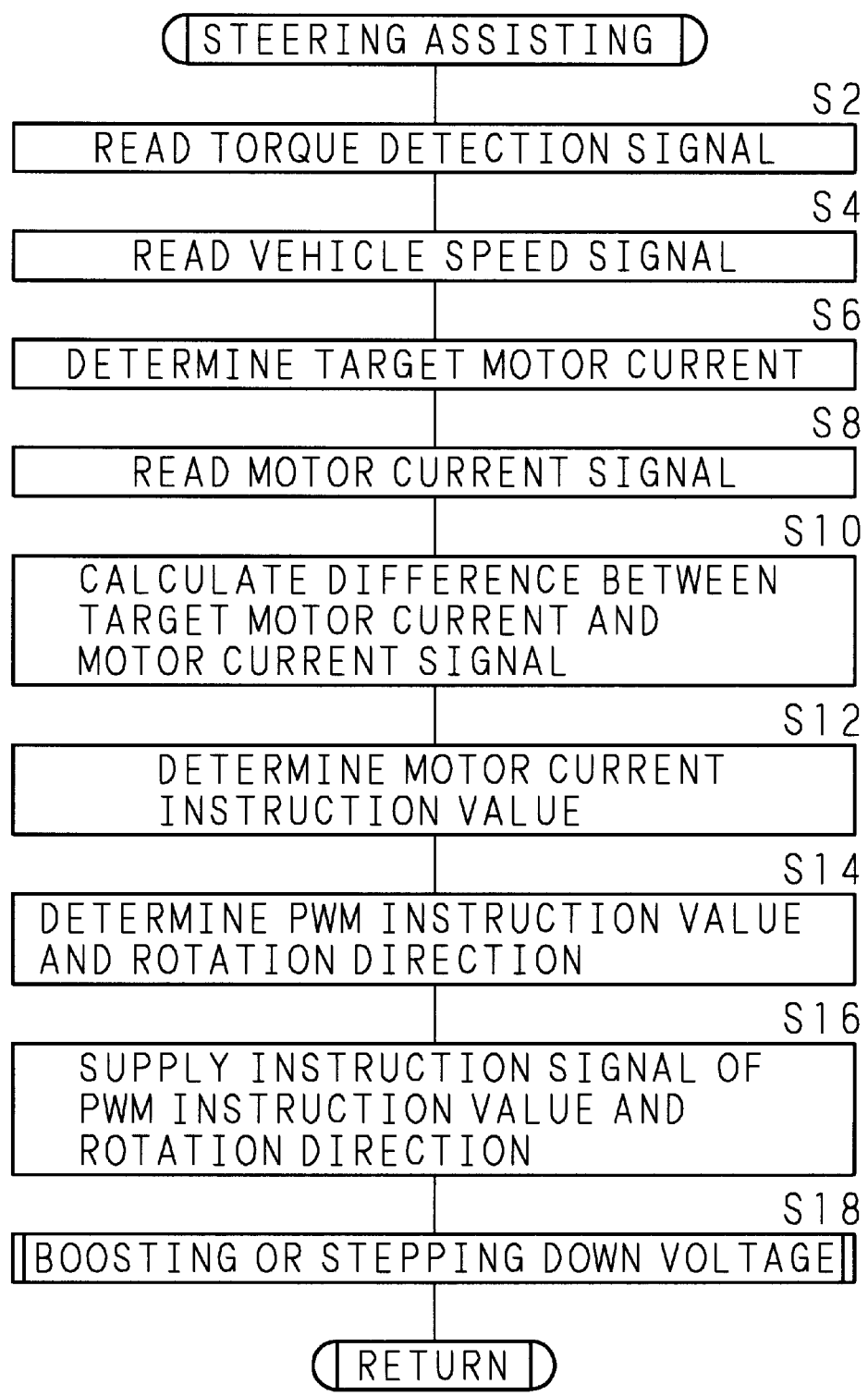
FIG. 4 is a flowchart showing an operation of the electric power steering apparatus shown in FIG. 2.

An operation of the electric power steering apparatus structured as described above will be described with reference to the flowchart of FIG. 4 showing it.

In a steering assisting operation, first, the microcomputer 12 reads through the interface circuit 11 the torque detection signal detected by the torque sensor 10 (step S2), and then, reads through the interface circuit 21 the vehicle speed signal detected by the vehicle speed sensor 20 (step S4).

Based on the vehicle speed signal read at step S4 and the torque detection signal read at step S2, the microcomputer 12 determines the target motor current with reference to the torque/current table 18a (step S6).

Then, the microcomputer 12 reads the motor current signal from the motor current detection circuit 17 (step S8), calculates the difference between the target motor current determined at step S6 and the motor current signal read at step S8 (step S10), and based on the calculated difference, determines the motor current instruction value in order that the target motor current flows through the brushless motor 24 (step S12).

Then, the microcomputer 12 determines the PWM instruction value and the rotation direction in accordance with the motor current instruction value determined at step S12 (step S14), and supplies an instruction signal representative of the determined PWM instruction value and rotation direction to the motor drive circuit 13 (step S16) and based on the PWM instruction value, performs an operation to boost or step down the voltage applied to the switching circuit 8b of the motor drive circuit 13 (step S18). Then, the microcomputer 12 returns and shifts to another process.

Based on the supplied instruction signal representative of the PWM instruction value and the rotation direction, the motor drive circuit 13 rotates the brushless motor 24.

Figure 5:
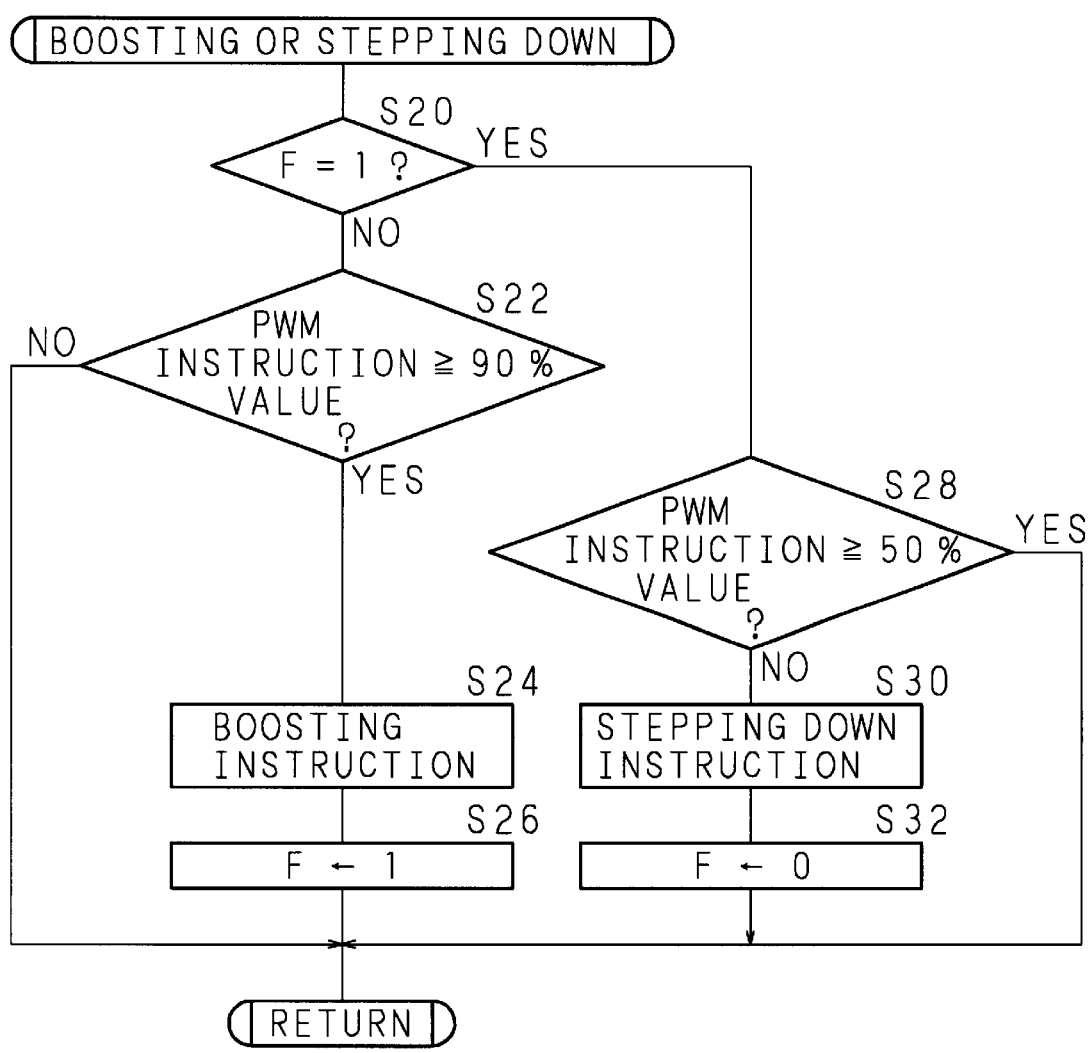
FIG. 5 is a flowchart showing an operation to boost or step down the voltage applied to a switching circuit.

FIG. 5 is a flowchart showing the operation to boost or step down the voltage applied to the switching circuit 8b (step S18).

First, the microcomputer 12 judges whether a flag F is 1 or not (step S20), and when the flag F is not 1, judges whether the PWM instruction value determined at step S14 is higher than 90% or not (step S22).

The switching circuit 8b controls the voltage (average voltage) actually applied to the brushless motor 24 by the gate control circuit 8c performing the On/Off operation in accordance with the PWM instruction value when the applied power supply voltage of the mounted battery P is, for example, 12 V, whereby the target motor current is flown through the brushless motor 24.

Figure 6A:
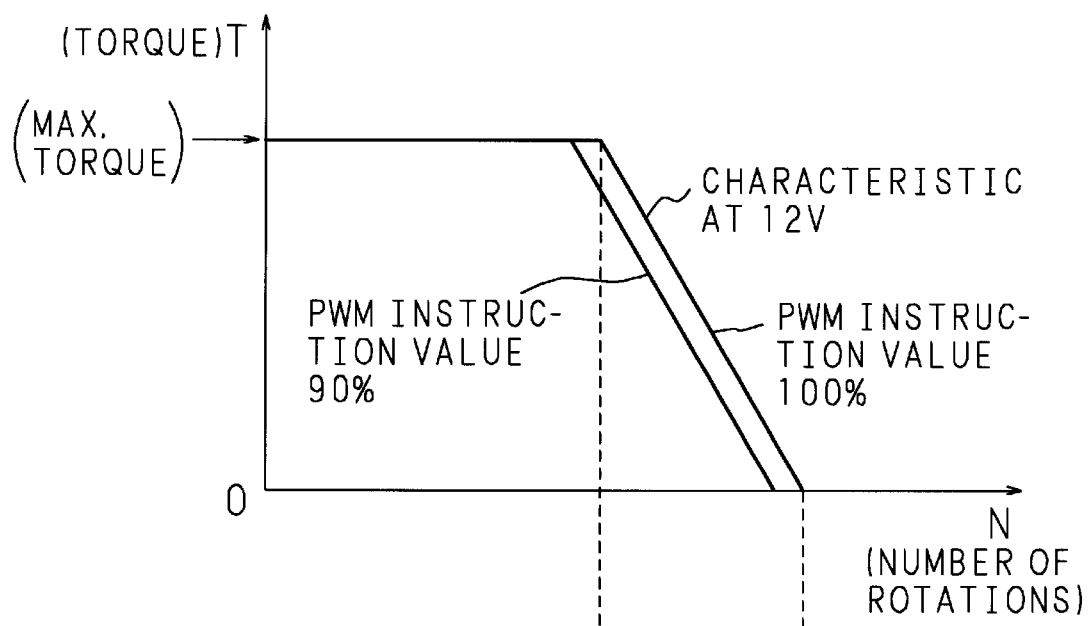
FIGS. 6A and 6B are explanatory views of the operation of the electric power steering apparatus according to the present invention.

Therefore, as shown in FIG. 6A, when the PWM instruction value is 90%, the voltage (average voltage) actually applied to the brushless motor 24 is lower than 12 V which is actually applied when the PWM instruction value is 100%.

When the PWM instruction value determined at step S14 is higher than 90% (YES at step S22), the microcomputer 12 supplies a boosting instruction to the PWM circuit 25 (step S24), and sets the flag F to 1 (step S26).

Figure 6B:
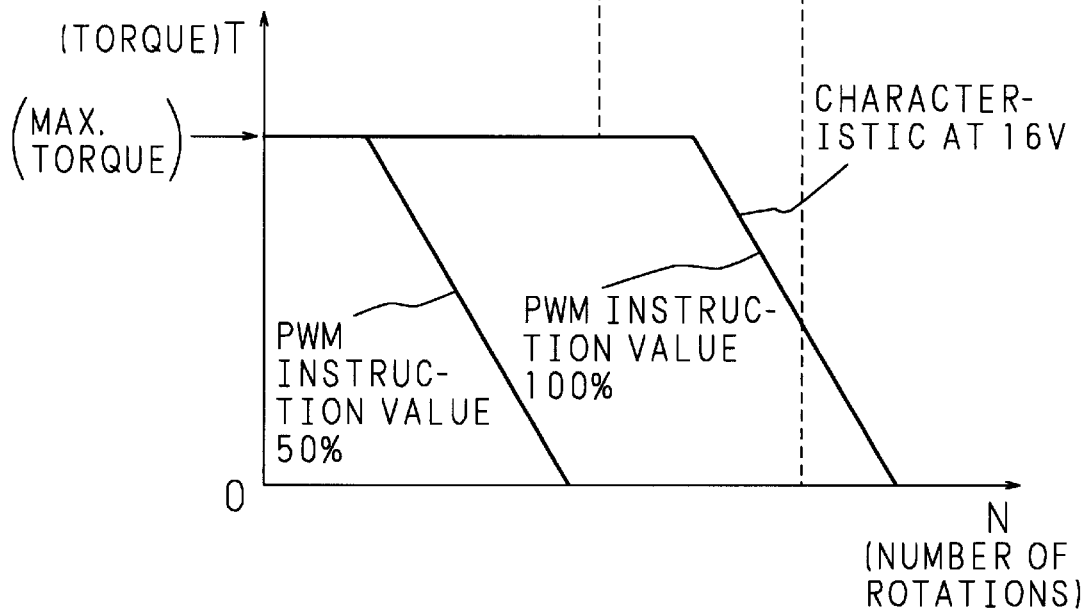

When supplied with the boosting instruction, the PWM circuit 25 turns on or off the transistor Q7 by a predetermined PWM signal, actuates the boosting chopper circuit 8d, and boosts the voltage applied to the switching circuit 8b, for example, to 16 V as shown in FIG. 6B.

When the voltage is boosted to 16 V, the microcomputer 12 controls the voltage so as to be held at 16 V by a boosting instruction with the voltage detection signal from the circuit voltage detection circuit 26 as a feedback signal.

When the PWM instruction value determined at step S14 is lower than 90% (NO at step S22), the microcomputer 12 returns to the steering assisting operation.

The microcomputer 12 performs the steering assisting operation shown in the flowchart of FIG. 4 when the boosting chopper circuit 8d operates and the voltage applied to the switching circuit 8b is boosted as well as when the voltage is not boosted.

When the flag F is 1 (YES at step S20), which is when the voltage applied to the switching circuit 8b is boosted to 16 V as shown in FIG. 6B, the microcomputer 12 judges whether the PWM instruction value determined at step S14 is lower than 50% or not (step S28).

When the PWM instruction value determined at step S14 is lower than 50% (NO at step S28) (the voltage (average voltage) actually applied to the brushless motor 24 is lower than 12 V), the microcomputer 12 supplies a stepping down instruction to the PWM circuit 25 (step S30), and sets the flag F to 0 (step S32).

When supplied with the stepping down instruction, the PWM circuit 25 stops the operation of the boosting chopper circuit 8d, and returns the voltage applied to the switching circuit 8b to 12 V as shown in FIG. 6A.

When the PWM instruction value determined at step S14 is higher than 50% (YES at step S28), the microcomputer 12 returns to the steering assisting operation.

As the motor current instruction value, the duty ratio is varied by a PWM method that modulates the application pulse width of the voltage. Specifically, the motor current instruction value is outputted as the PWM instruction value to control the assisting force of the motor.

For example, in the case of a synchronous sinusoidal approximation PWM method that contrasts a sinusoidal wave and a triangular wave, the duty ratio (PWM value) between the half-wave lengths of a sinusoidal wave becomes the motor current instruction value.

Second Embodiment

Figure 7:
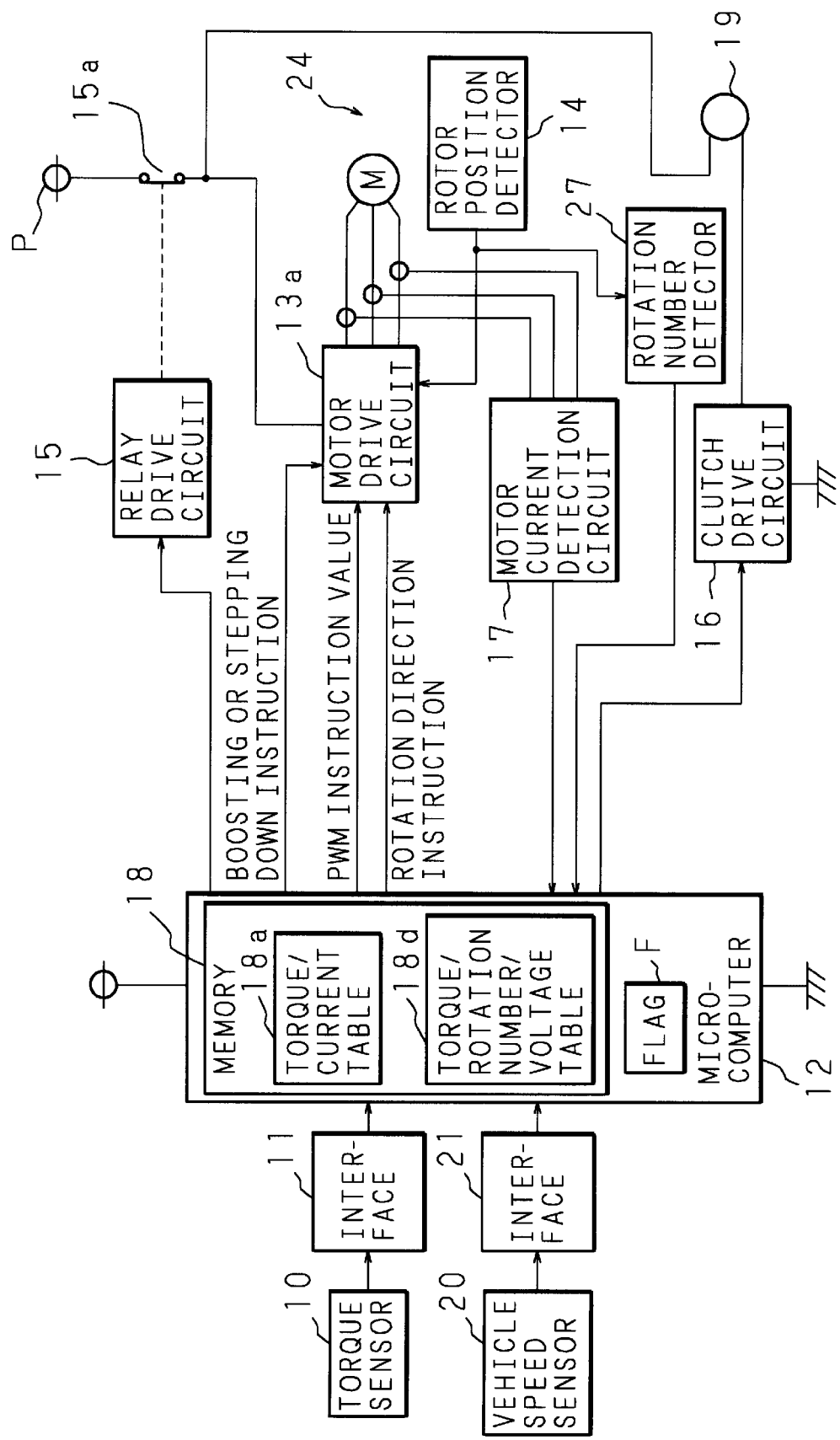
FIG. 7 is a block diagram showing the structure of an essential portion of an embodiment of the electric power steering apparatus according to the present invention.

FIG. 7 is a block diagram showing the structure of an essential portion of a second embodiment of the electric power steering apparatus according to the present invention. In this electric power steering apparatus, the rotor position signal detected by a rotor position detector 14 is supplied to a rotation number detector 27, and the rotation number detector 27 detects the number of rotations of a brushless motor 24 from the supplied rotor position signal and supplies the rotation number signal to a microcomputer 12.

Figure 10:
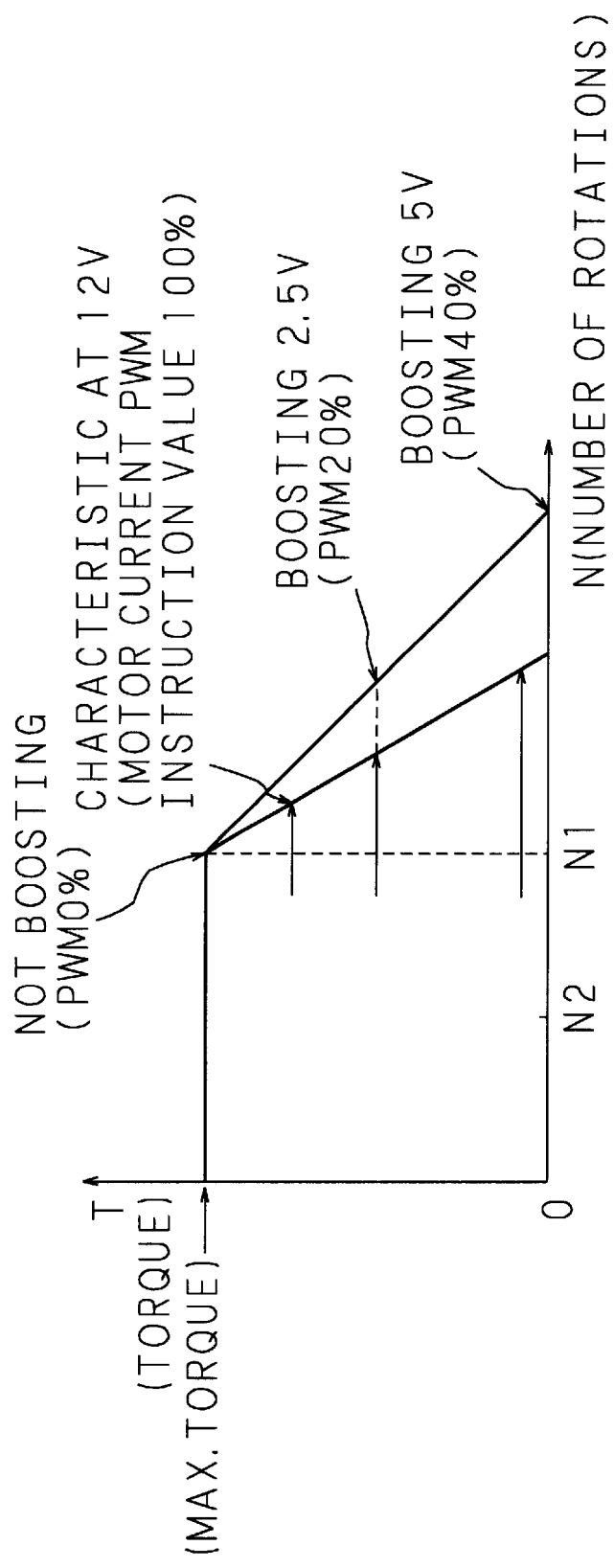
FIG. 10 is an explanatory view of the operation of the electric power steering apparatus according to the present invention.

The microcomputer 12 is provided in a memory 18 with a torque/rotation number/voltage table 18d in which the relationship among the torque detection signal from a torque sensor 10, the rotation number signal from the rotation number detector 27 and the voltage to be applied to the switching circuit 8b is determined as shown in FIG. 10 described later.

Figure 8:
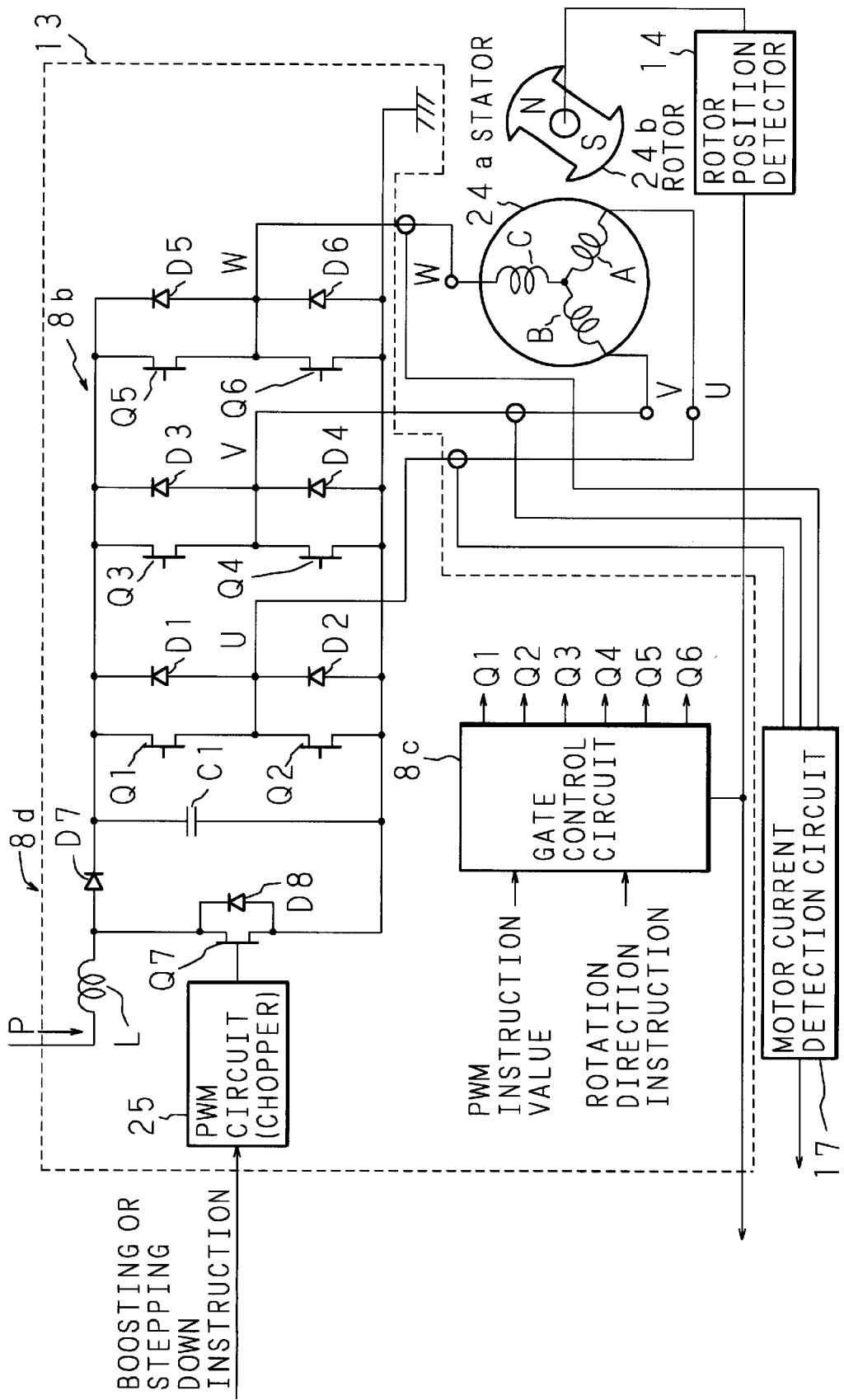
FIG. 8 is a block diagram showing the structure of the second embodiment of a brushless motor, a motor drive circuit and a motor current detection circuit.

FIG. 8 is a block diagram showing the structure of the brushless motor 24, a motor drive circuit 13a and a motor current detection circuit 17. The rotor position signal detected by the rotor position detector 14 is supplied to the rotation number detector 27 as mentioned above. The motor drive circuit 13a which has a different structure from that shown in FIG. 3 is not provided with the circuit voltage detection circuit 26 that detects the voltage across the smoothing capacitor C1. Except this, the structure is the same as the structure of the electric power steering apparatus described in the first embodiment (FIGS. 2 and 3). Therefore, like elements are denoted by like reference numerals, and description thereof is omitted.

An operation of the electric power steering apparatus structured as described above will be described with reference to the flowchart showing it.

Figure 9:
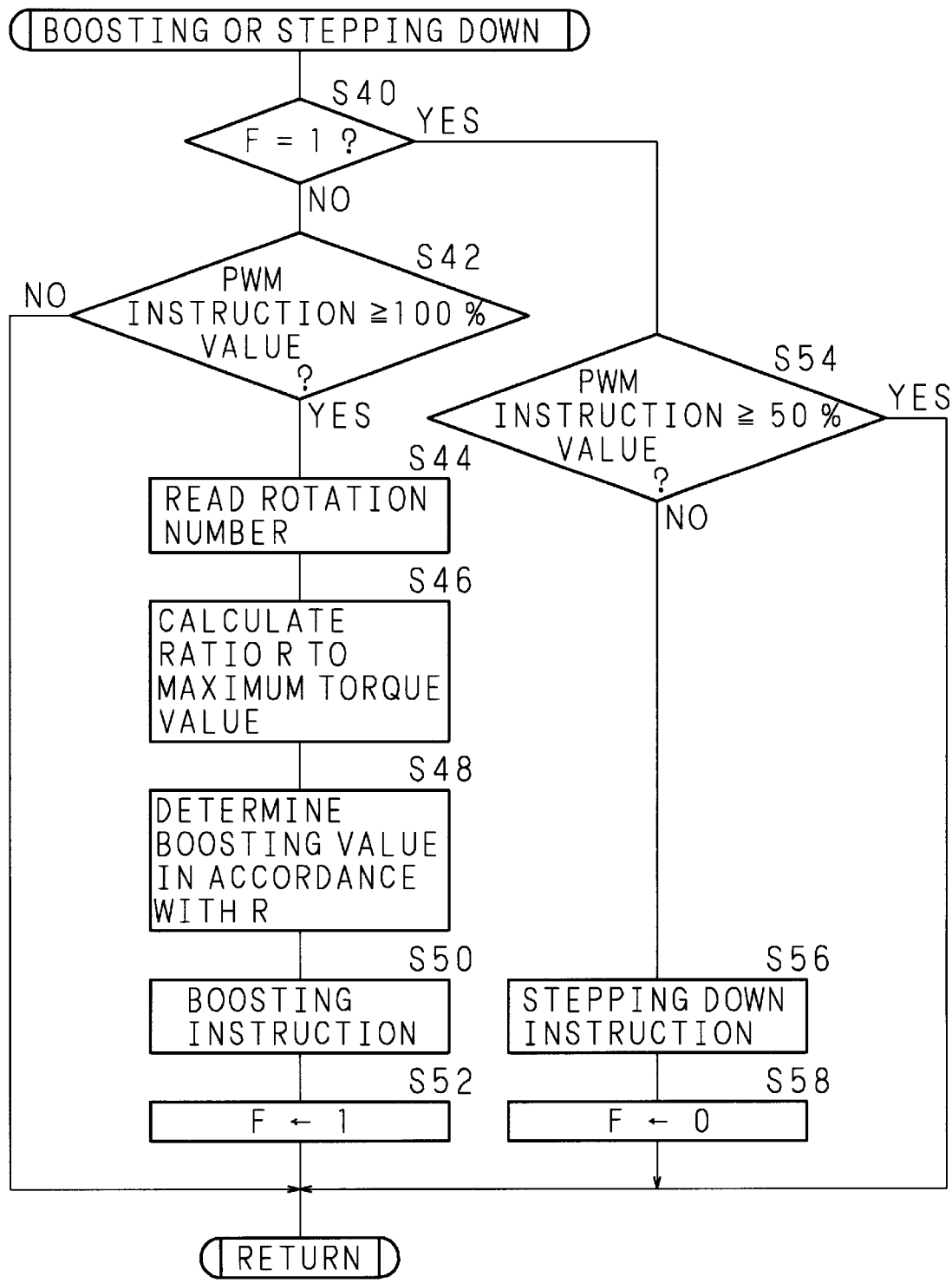
FIG. 9 is a flowchart showing an operation to boost or step down the voltage applied to a switching circuit.

Description of the steering assisting operation performed by the microcomputer 12 is omitted since it is the same as that of the flowchart of FIG. 4 described in the first embodiment, and an operation to boost or step down the voltage applied to the switching circuit 18b (step S18) will be described with reference to the flowchart of FIG. 9 showing it.

First, the microcomputer 12 judges whether the flag F is 1 or not (step S40). When the flag F is not 1, which is when the voltage applied to the switching circuit 8b is not boosted, the microcomputer 12 judges whether the PWM instruction value determined at step S14 is 100% or not (step S42).

The switching circuit 8b controls the voltage (average voltage) actually applied to the brushless motor 24 by the gate control circuit 8c performing the On/Off operation in accordance with the PWM instruction value when the applied power supply voltage of the mounted battery P is, for example, 12 V, whereby the target motor current is flown through the brushless motor 24.

Therefore, when the PWM instruction value is 100%, the voltage (average voltage) actually applied to the brushless motor 24 is 12 V as shown in FIG. 10, and when the PWM instruction value is not 100%, the actually applied voltage (average voltage) is lower than 12 V.

When the PWM instruction value determined at step S14 is 100% (YES at step S42), the microcomputer 12 reads the rotation number signal from the rotation number detector 27 (step S44), and based on the rotation number signal and the torque/rotation number/voltage table 18d as shown in FIG. 10, calculates the rotation torque value of the brushless motor 24 corresponding to the rotation number signal or the ratio R of the rotation torque value to the maximum torque value when the voltage applied to the switching circuit 8b is 12 V (step S46).

Then, the microcomputer 12 determines the boosting value corresponding to the rotation torque value or the ratio R calculated at step S46 from the torque/rotation number/voltage table 18d, supplies the boosting instruction to the PWM circuit 25 (step S50), and sets the flag F to 1 (step S52). The boosting instruction represents a PWM value 20% when the boosting value corresponding to the ratio R is, for example, 2.5 V as shown in FIG. 10, and represents a PWM value 40% when the boosting value is 5 V.

The boosting instruction is not supplied when the rotation torque value calculated at step S46 is the maximum torque value or when the ratio R is 100%.

When supplied with the boosting instruction, the PWM circuit 25 turns on or off the transistor Q7 by the PWM signal, actuates the boosting chopper circuit 8d, and boosts the voltage applied to the switching circuit 8b, for example, by 2.5 V to 14.5 V or by 5 V to 17 V as shown in FIG. 10.

When the PWM instruction value determined at step S14 is not 100% (NO at step S42), the microcomputer 12 returns to the steering assisting operation.

The microcomputer 12 performs the steering assisting operation shown in the flowchart of FIG. 4 when the boosting chopper circuit 8d operates and the voltage applied to the switching circuit 8b is boosted as well as when the voltage is not boosted.

When the flag F is 1 (YES at step S40), which is when the voltage applied to the switching circuit 8b is boosted as shown in FIG. 10, the microcomputer 12 judges whether the PWM instruction value determined at step S14 is lower than 50% or not (step S54).

When the PWM instruction value determined at step S14 is lower than 50% (NO at step S54) (the voltage (average voltage) actually applied to the brushless motor 24 is lower than 12 V), the microcomputer 12 supplies a stepping down instruction to the PWM circuit 25 (step S56), and sets the flag F to 0 (step S58).

When supplied with the stepping down instruction, the PWM circuit 25 stops the operation of the boosting chopper circuit 8d, and returns the voltage applied to the switching circuit 8b to 12 V as shown in FIG. 10.

When the PWM instruction value determined at step S14 is higher than 50% (YES at step S54), the microcomputer 12 returns to the steering assisting operation.

In the above-described second embodiment, instead of judging whether the PWM instruction value is 100% or not (step S42), reading the number of rotations (step S44) and calculating the ratio R (step S46), the microcomputer 12 may perform the following: reading the rotation number signal from the rotation number detector 27, judging whether the number of rotations is lower than the number of rotations N1 corresponding to the motor current PWM instruction value 100% at the maximum torque as shown in FIG. 10 and determining the predetermined boosting value in accordance with the read number of rotations when it is judged that the number of rotations is lower than the number of rotations N1 (step S48). In this case, instead of judging whether the PWM instruction value is lower than 50% or not at step S54, the microcomputer 12 judges whether or not the PWM instruction value is lower than the number of rotations N2 that is lower than the number of rotations N1 as shown in FIG. 10. The stepping down instruction is supplied to the PWM circuit 25 when the PWM instruction value is lower than the number of rotations N2 (step S56).

Moreover, the microcomputer 12 may perform the following: comparing the above-described PWM instruction value and the number of rotations read from the rotation number detector 27 with a predetermined PWM instruction value and the number of rotations N1, respectively, determining the predetermined boosting value in accordance with the PWM instruction value and the number of rotations based on the result of the comparison, supplying the boosting instruction to the PWM circuit 25 (step S50), comparing the above-described PWM instruction value and the number of rotations read from the rotation number detector 27 with the PWM instruction value 50% and the number of rotations N2, respectively, and supplying the stepping down instruction to the PWM circuit 25 based on the result of the comparison (step S56).

Moreover, the voltage of the mounted battery as set forth in claims is not limited to one that is directly applied to the drive circuit, but includes one that is indirectly applied to the drive circuit through another circuit.

Third Embodiment

In the above-described electric power steering apparatuses, the boosting circuit that boosts the voltage of the mounted battery is used for supplying a voltage from which a stable steering assisting force is always obtained, and for the boosting circuit, a diode is used for preventing backflow of current to the mounted battery. Therefore, the current to be fed back to the mounted battery is not fed back even when the motor generates electric power, for example, in a case where the steering wheel is returned, so that the voltage increases, for example, there is a case where the voltage increases to 30 V or higher for a boosting voltage 16 V of the boosting circuit. This can damage the motor and its drive circuit.

Therefore, as a third embodiment, an electric power steering apparatus will be described below in which a voltage from which a stable steering assisting force is always obtained can be supplied to the steering assisting motor even when the output voltage of the mounted battery fluctuates, the size of the steering assisting motor can be further reduced, and the motor and its drive circuit are never damaged by the electric power generated by the motor.

Figure 11:
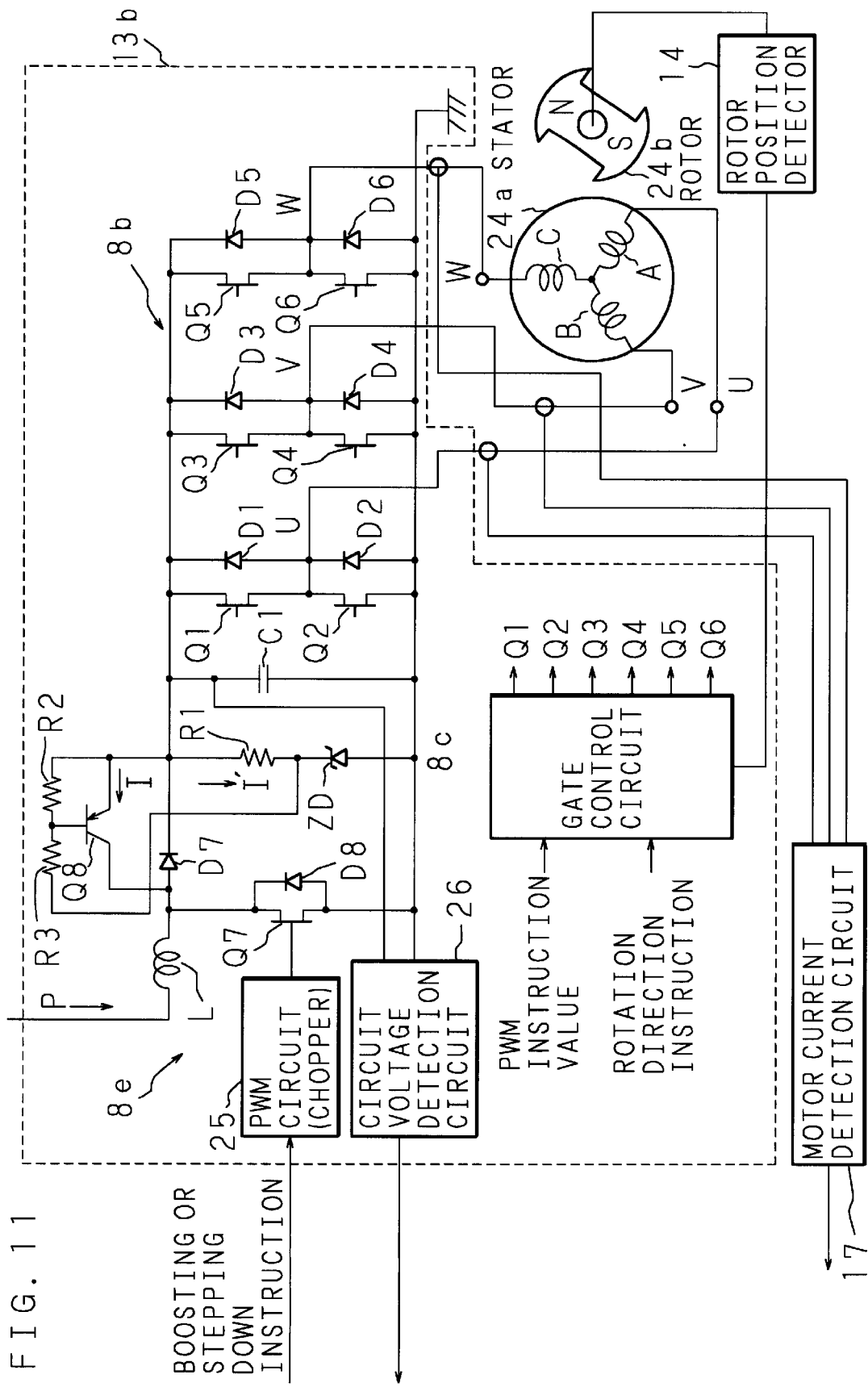
FIG. 11 is a block diagram showing the structure of the third embodiment of a brushless motor, a motor drive circuit and a motor current detection circuit.

FIG. 11 is a block diagram showing the structure of the brushless motor 24, a motor drive circuit 13b and the motor current detection circuit 17 of the third embodiment, and is different in the structure of the motor drive circuit 13b from the block diagram showing the structure of the brushless motor 24, the motor drive circuit 13 and the motor current detection circuit 17 of the first embodiment shown in FIG. 3.

Specifically, in a boosting chopper circuit 8e of the motor drive circuit 13b of the third embodiment, a resistance R1 and a Zener diode ZD are connected in series between the positive terminal and the negative terminal of the smoothing capacitor C1, and a series circuit of resistances R3 and R2 is connected between the node of one terminal of the resistance R1 and the cathode of the Zener diode ZD, and the other terminal of the resistance R1. The point of connection of the resistances R3 and R2 is connected to the base of a PNP transistor Q8 (switching element), so that the resistances R3 and R2 serve as a bias circuit of the transistor Q8.

The emitter of the transistor Q8 is connected to the other terminal of the resistance R1, and the collector thereof is connected to the anode of the diode D7.

The structure of the parts other than these will not be described because they are similar to the structure of those of the first embodiment.

In the third embodiment, in the operation of the first embodiment shown in FIG. 5, when the electric power generated by the brushless motor 24 increases, for example, by the steering wheel being returned and the voltage applied to the switching circuit 8b increases to a value higher than the Zener voltage (for example, 18 V) of the Zener diode ZD, the Zener diode ZD is turned on, so that a current I' flows through the resistance R1. Consequently, the bias voltage to the base of the transistor Q8 by the resistances R3 and R2 becomes lower than the emitter voltage of the transistor Q8 to turn on the transistor Q8, so that a current I is returned from the switching circuit 8b to the mounted battery P through the coil L.

When the current I is returned from the switching circuit 8b to the mounted battery P and the voltage applied to the switching circuit 8b decreases to a value lower than the Zener voltage of the Zener diode ZD, the Zener diode ZD is turned off, and the transistor Q8 is also turned off.

When the voltage applied to the switching circuit 8b increases due to the electric power generated by the brushless motor 24, the Zener diode ZD and the transistor Q8 are repetitively turned on and off through the above-described operation, so that the voltage never largely exceeds the Zener voltage of the Zener diode ZD.

While the motor current instruction value is used for judging whether the output of the brushless motor 24 is insufficient or excessive in the third embodiment, for example, the number of rotations of the brushless motor 24 may be used.

In the third embodiment of the electric power steering apparatus of the present invention as described above, a voltage from which a stable steering assisting force is always obtained can be supplied to the steering assisting motor even when the voltage of the mounted battery fluctuates, the size of the steering assisting motor can be further reduced, and the motor and its drive circuit are never damaged by the electric power generated by the motor.

Fourth Embodiment

In the above-described electric power steering apparatuses, the boosting chopper circuit that boosts the voltage of the mounted battery is used for supplying a voltage from which a stable steering assisting force is always obtained. However, in the boosting chopper circuit which performs chopping at a fixed frequency, electromagnetic noises, particularly electromagnetic noises audible to human ears are readily caused.

Therefore, as a fourth embodiment, an electric power steering apparatus will be described below in which a voltage from which a stable steering assisting force is always obtained can be supplied to the steering assisting motor even when the voltage of the mounted battery fluctuates, the size of the steering assisting motor can be further reduced, and the influence of the electromagnetic noises caused by the boosting chopper circuit can be reduced.

Figure 12:
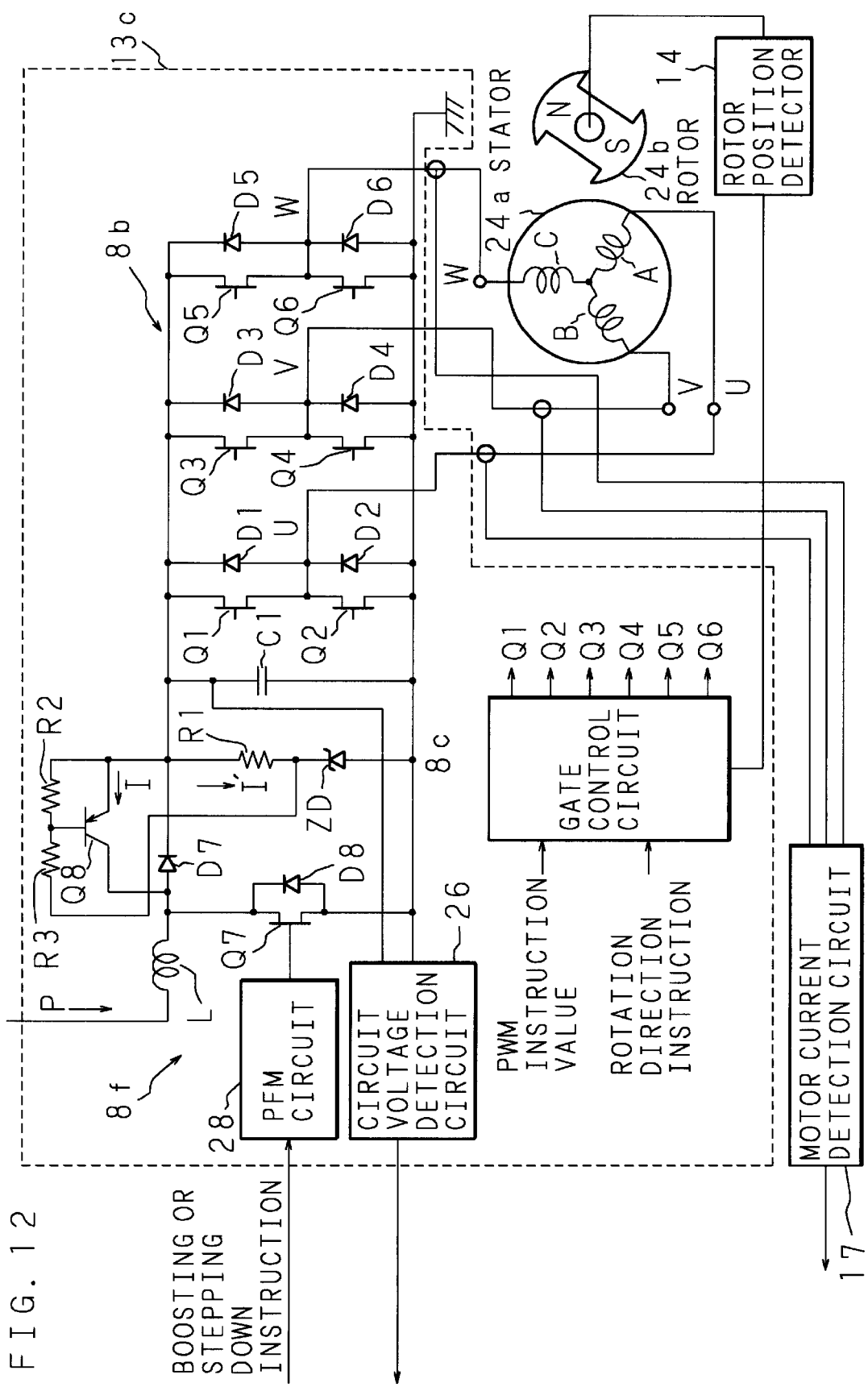
FIG. 12 is a block diagram showing the structure of the fourth embodiment of a brushless motor, a motor drive circuit and a motor current detection circuit.

FIG. 12 is a block diagram showing the structure of the brushless motor 24, a motor drive circuit 13c and the motor current detection circuit 17 of the fourth embodiment, and is different in the structure of the motor drive circuit 13c from the block diagram showing the structure of the brushless motor 24, the motor drive circuit 13b and the motor current detection circuit 17 of the third embodiment shown in FIG. 11.

Specifically, in a boosting chopper circuit 8f of the motor drive circuit 13c of the fourth embodiment, instead of the PWM circuit 25 of the third embodiment, a PFM (pulse frequency modulation) circuit 28 that produces a PFM signal based on a boosting or stepping down instruction (boosting instruction, stepping down instruction) supplied from the microcomputer 12 and outputs the produced PFM signal is connected to the gate of the transistor Q7.

The coil L, the diode D7, the smoothing capacitor C1, the transistor Q7 and the PFM circuit 28 constitute the boosting chopper circuit 8f.

In the fourth embodiment of the electric power steering apparatus of the present invention as described above, the microcomputer 12 (PFM controlling means), when the voltage of the mounted battery (P) is boosted at 16 V, controls the PFM circuit 28 to keep the voltage 16 V according to the boosting instruction with use of the voltage detection signal from the circuit voltage detection circuit 26 as a feedback signal.

The voltage applied to the motor drive circuit 13c varies by change of voltage of the mounted battery and change of motor current. Therefore, applied voltage being boosted is kept constant by controlling the duty ratio of the PFM circuit 28.

The PFM circuit 28, when stepping down instruction is given, stops operation of the boosting chopper circuit 8f and returns the voltage applied to the switching circuit 8b to 12 V as shown in FIG. 6A.

In the fourth embodiment of the electric power steering apparatus of the present invention as described above, a voltage from which a stable steering assisting force is always obtained can be supplied to the steering assisting motor even when the output voltage of the mounted battery fluctuates, the size of the steering assisting motor can be further reduced, and the electromagnetic noises caused by the boosting chopper circuit are converted into white noises, so that the influence of the electromagnetic noises can be reduced.

Fifth Embodiment

While the brushless motor 24 is used as the steering assisting motor in the above-described embodiments, it is to be noted that a brush-type motor may be used. A case where a brush-type motor is used will hereinafter be described.

Figure 13:
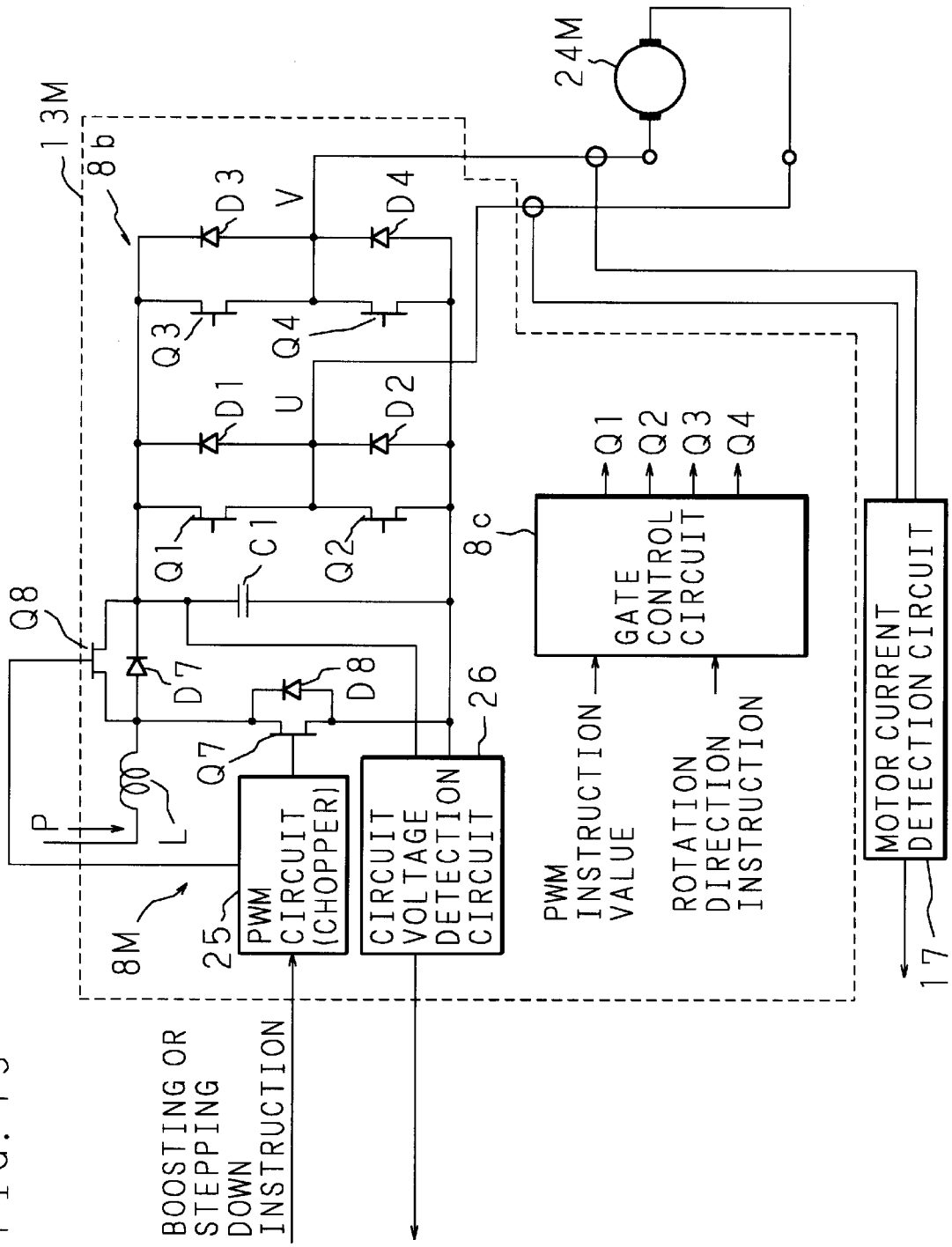
FIG. 13 is a block diagram showing the structure of the fifth embodiment of a brush-type motor, a motor drive circuit and a motor current detection circuit.

FIG. 13 is a block diagram showing the structure of a brush-type motor 24M, a motor drive circuit 13M and the motor current detection circuit 17. While the brushless motor 24 of FIG. 3 of the first embodiment is replaced by the brush-type motor 24M in the example shown in FIG. 13, the brushless motors 24 shown in FIGS. 8, 11 and 12 may similarly be replaced by the brush-type motor 24M.

In the motor drive circuit 13M, the power supply voltage of the mounted battery P is applied to the anode of the diode D7 through the coil L, and the cathode of the diode D7 is connected to the positive electrode side terminal of the switching circuit 8b. The diode D7 is connected so as to be parasitic between the source and the drain of the transistor Q8. The transistor Q7 is connected between the anode of the diode D7 and the grounding terminal, and the diode D8 is parasitic between the source and the drain of the transistor Q7. The smoothing capacitor C1 is connected between the cathode of the diode D7 and the grounding terminal, and the circuit voltage detection circuit 26 that detects the voltage across the smoothing capacitor C1 is connected across the smoothing capacitor C1. The detected voltage outputted by the circuit voltage detection circuit 26 is supplied to the microcomputer 12.

To the gates of the transistors Q7 and Q8, the PWM circuit 25 is connected that produces a PWM signal based on a boosting or stepping down instruction (boosting instruction, stepping down instruction) supplied from the microcomputer 12 and outputs the produced PWM signal.

The coil L, the diode D7, the smoothing capacitor C1, the transistors Q7 and Q8, and the PWM circuit 25 constitute a boosting chopper circuit 8M (chopper circuit).

In the switching circuit 8b, the transistors Q1 and Q2 connected in series between the positive electrode side terminal and the grounding terminal, and the diodes D1 and D2 connected in series in the reverse direction are connected in parallel; and the transistors Q3 and Q4 connected in series and the diodes D3 and D4 connected in series in the reverse direction are connected in parallel.

To the common node of the transistors Q1 and Q2 and the common node of the diodes D1 and D2, one brush of the brush-type motor 24M is connected. To the common node of the transistors Q3 and Q4 and the common node of the diodes D3 and D4, the other brush of the brush-type motor 24M is connected.

The gate control circuit 8c is supplied with the rotation direction and the motor current instruction value (PWM instruction value) from the microcomputer 12.

The gate control circuit 8c PWM-controls the On/Off of the transistors Q1 to Q4 in accordance with the motor current instruction value to thereby increase or decrease the rotation torque of the brush-type motor 24M.

The diodes D1 to D4 are provided for absorbing noises caused by the On/Off of the transistors Q1 to Q4.

The motor current detection circuit 17 detects the currents flowing through the brushes of the brush-type motor 24M, and supplies the detected currents to the microcomputer 12 as the motor current signal.

When the brush-type motor 24M as described above is used, the electric power steering apparatus according to the present invention basically operates in a similar manner to the embodiment shown in FIG. 3 (or FIG. 8, 11 or 12).

According to the electric power steering apparatus of the first invention, a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the second invention, when it becomes unnecessary to boost the voltage of the mounted battery applied to the drive circuit, the voltage can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

According to the electric power steering apparatus of the third and the fourth inventions, the voltage of the mounted battery can be boosted in accordance with the rotation torque of the motor when the motor current instruction value is maximum, and a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the fifth invention, when it becomes unnecessary to boost the voltage of the mounted battery applied to the drive circuit, the boosted voltage of the mounted battery can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

According to the electric power steering apparatus of the sixth invention, the voltage of the mounted battery can be boosted in accordance with the number of rotations of the motor, and a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the seventh and the ninth inventions, when it becomes unnecessary to boost the voltage of the mounted battery applied to the drive circuit, the boosted voltage of the mounted battery can be stepped down, and when a large steering assisting force becomes unnecessary, the voltage of the mounted battery can be supplied to the steering assisting motor without boosted, so that an electric power steering apparatus is realized in which the efficiency of the steering assisting motor can be prevented from being reduced by the boosting of the voltage of the mounted battery.

According to the electric power steering apparatus of the eighth invention, the voltage of the mounted battery can be boosted in accordance with the rotation torque of the motor and the number of rotations of the motor when the motor current instruction value is maximum, and a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the tenth invention, by the boosting circuit of a simple structure, a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the eleventh invention, a voltage from which a stable steering assisting force is always obtained can be supplied to the steering assisting motor even when the voltage of the mounted battery falls, so that an electric power steering apparatus in which the steering assisting motor has a reduced size is realized.

According to the electric power steering apparatus of the twelfth invention, an electric power steering apparatus is realized in which a voltage from which a stable steering assisting force is always obtained can be supplied to the steering assisting motor even when the voltage of the mounted battery fluctuates, the size of the steering assisting motor can be further reduced.

According to the electric power steering apparatus of the thirteenth invention, an electric power steering apparatus is realized in which a voltage from which a stable steering assisting force is always obtained can be supplied to the steering assisting motor even when the voltage of the mounted battery fluctuates, the size of the steering assisting motor can be further reduced, and the electromagnetic noises caused by the boosting chopper circuit are converted into white noises, so that the influence of the electromagnetic noises can be reduced.

According to the electric power steering apparatus of the fourteenth invention, an electric power steering apparatus is realized in which a voltage from which a stable steering assisting force is always obtained can be supplied to the steering assisting motor even when the voltage of the mounted battery fluctuates, the size of the steering assisting motor can be further reduced, and the motor and its drive circuit are never damaged by the electric power generated by the motor.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus being provided with: a torque sensor for detecting a steering torque applied to a steering wheel; and a steering assisting motor driven by a drive circuit to which a voltage of a mounted battery is applied, in which a motor current instruction value representative of a value of current to flow through said motor is determined based on the steering torque detected by said torque sensor, said drive circuit rotates said motor in accordance with the determined motor current instruction value, and a steering power is assisted by a rotation torque outputted by said motor, said electric power steering apparatus comprising:

judging means for judging whether the motor current instruction value is higher than a first threshold value;

a boosting instruction generator operative, when said judging means judges that the motor current instruction value is higher, and outputting a boosting instruction; and a boosting circuit boosting the voltage of said mounted battery in response to the boosting instruction, wherein said voltage boosted by said boosting circuit is applied to said drive circuit so that boosted voltage is applied with increased steering torque.

2. An electric power steering apparatus as set forth in claim 1, further comprising:

judging means for judging whether or not the motor current instruction value is lower than a second threshold value that is lower than the first threshold value during said boosting circuit boosts the voltage of said mounted battery; and stepping down instruction outputting means for, when said judging means judges that the motor current instruction value is lower, outputting a stepping down instruction for stepping down the voltage, wherein said boosting circuit stops the boosting of the voltage of said mounted battery in response to the stepping down instruction outputted by said stepping down instruction outputting means.

3. An electric power steering apparatus as set forth in claim 1, further comprising calculating means for calculating the rotation torque when said judging means judges that the motor current instruction value is higher; wherein said boosting instruction generator outputs a boosting instruction for boosting the voltage of said mounted battery to a predetermined voltage in accordance with the rotation torque calculated by said calculating means.

4. An electric power steering apparatus as set forth in claim 3, further comprising:

judging means for judging whether or not the motor current instruction value is lower than a second threshold value that is lower than the first threshold value during said boosting circuit boosts the voltage of said mounted battery to the predetermined voltage; and stepping down instruction outputting means for, when said judging means judges that the motor current instruction value is lower, outputting a stepping down instruction for stepping down the voltage, wherein said boosting circuit stops the boosting of the voltage of said mounted battery to the predetermined voltage in response to the stepping down instruction outputted by said stepping down instruction outputting means.

5. An electric power steering apparatus as set forth in claim 1, further comprising calculating means for, when said judging means judges that the motor current instruction value is higher, calculating a ratio of the rotation torque to a maximum rotation torque that can be outputted by said motor; wherein said boosting instruction generator outputs a boosting instruction for boosting the voltage of said mounted battery to a predetermined voltage in accordance with the ratio calculated by said calculating means.

6. An electric power steering apparatus as set forth in claim 5, further comprising:

judging means for judging whether or not the motor current instruction value is lower than a second threshold value that is lower than the first threshold value during said boosting circuit boosts the voltage of said mounted battery to the predetermined voltage; and stepping down instruction outputting means for, when said judging means judges that the motor current instruction value is lower, outputting a stepping down instruction for stepping down the voltage, wherein said boosting circuit stops the boosting of the voltage of said mounted battery to the predetermined voltage in response to the stepping down instruction outputted by said stepping down instruction outputting means.

7. An electric power steering apparatus as set fourth in claim 1, wherein said boosting circuit has a chopper that is actuated by the boosting instruction.

8. An electric power steering apparatus as set forth in claim 7, further comprising:

detecting means for detecting voltage applied to said drive circuit; and

PWM controlling means for controlling operation of said boosting circuit based on detected value by said detecting means so as to keep the boosting voltage constant.

9. An electric power steering apparatus as set forth in claim 7, further comprising:

detecting means for detecting voltage applied to said drive circuit; and

PFM controlling means for controlling operation of said boosting circuit by varying operation frequency based on detected value by said detecting means so as to keep the boosting voltage constant.

10. An electric power steering apparatus as set forth in claim 1, wherein said motor current instruction value is a duty ratio for pulse-width-modulation-controlling said motor, and said drive circuit rotates said motor through the pulse width modulation control based on the duty ratio.

11. An electric power steering apparatus being provided with: a torque sensor for detecting a steering torque applied to a steering wheel; and steering assisting motor driven by a drive circuit to which a voltage of a mounted battery is applied, in which a motor current instruction value representative of a value of a current to flow through said motor is determined based on the steering torque detected by said torque sensor, said drive circuit rotates said motor in accordance with the determined motor current instruction value, and a steering power is assisted by a rotation torque outputted by said motor, said electric power steering apparatus being characterized by comprising:

a rotation number detector for detecting a number of rotations of said motor;

judging means for judging whether the number of rotations detected by said rotation number detector is higher than a first threshold value or not;

boosting instruction outputting means for, when said judging means judges that the number of rotations is higher, outputting a boosting instruction for boosting the voltage of said mounted battery to a predetermined voltage in accordance with the number of rotations; and a boosting circuit for boosting the voltage of said mounted battery to the predetermined voltage in response to the boosting instruction outputted by said boosting instruction outputting means, wherein the predetermined voltage boosted by said boosting circuit is applied to said drive circuit.

12. An electric power steering apparatus as set forth in claim 11, further comprising:

first judging means for judging whether or not the number of rotations detected by said rotation number detector is lower than a second threshold value that is lower than said first threshold value during said boosting circuit boosts the voltage of said mounted battery to the predetermined voltage; and stepping down instruction outputting means for, when said first judging means judges that the number of rotations is lower, outputting a stepping down instruction for stepping down the voltage, wherein said boosting circuit stops the boosting of the voltage of said mounted battery to the predetermined voltage in response to the stepping down instruction outputted by said stepping down instruction outputting means.

13. An electric power steering apparatus as set forth in claim 12, further comprising:

second judging means for judging whether or not the motor current instruction value is lower than a fourth threshold value that is lower than said third threshold value during said boosting circuit boosts the voltage of said mounted battery to the predetermined voltage; wherein said stepping down instruction outputting means outputs a stepping down instruction for stepping down the predetermined voltage to the voltage of said mounted battery based on results of the judgements by said second judging means and said first judging means.

14. An electric power steering apparatus as set forth in claim 11, further comprising:

first judging means for judging whether the motor current instruction value is higher than a third threshold value or not; and calculating means for calculating said rotation torque when said first judging means judges that the motor current instruction value is higher, wherein said boosting instruction outputting means outputs a boosting instruction for boosting the voltage of said mounted battery to the predetermined voltage in accordance with the rotation torque calculated by said calculating means and the number of rotations, and said boosting circuit boosts the voltage of said mounted battery to the predetermined voltage in response to the boosting instruction outputted by said boosting instruction outputting means.

15. An electric power steering apparatus as set forth in claim 14, further comprising:

second judging means for judging whether or not the motor current instruction value is lower than a fourth threshold value that is lower than said third threshold value during said boosting circuit boosts the voltage of said mounted battery to the predetermined voltage; wherein said stepping down instruction outputting means outputs a stepping down instruction for stepping down the predetermined voltage to the voltage of said mounted battery based on results of the judgements by said second judging means and said first judging means.

16. An electric power steering apparatus as set fourth in claim 11, wherein said boosting circuit has a chopper that is actuated by the boosting instruction.

17. An electric power steering apparatus as set forth in claim 16, further comprising:

detecting means for detecting voltage applied to said drive circuit; and

PWM controlling means for controlling operation of said boosting circuit based on detected value by said detecting means so as to keep the boosting voltage constant.

18. An electric power steering apparatus as set forth in claim 16, further comprising:

detecting means for detecting voltage applied to said drive circuit; and

PFM controlling means for controlling operation of said boosting circuit by varying operation frequency based on detected value by said detecting means so as to keep the boosting voltage constant.

19. An electric power steering apparatus as set forth in claim 11, wherein said motor current instruction value is a duty ratio for pulse-width-modulation-controlling said motor, and said drive circuit rotates said motor through the pulse width modulation control based on the duty ratio.

20. An electric power steering apparatus being provided with: a torque sensor for detecting a steering torque applied to a steering wheel; and a steering assisting motor driven by a drive circuit to which a voltage of mounted battery is applied, in which a motor current instruction value representative of a value of a current to flow through said motor is determined based on the steering torque detected by said torque sensor, said drive circuit rotates said motor in accordance with the determined motor current instruction value, and a steering power is assisted by a rotation torque outputted by said motor, said electric power steering apparatus being characterized by comprising:

judging means for judging whether an output of said motor is insufficient or not;

boosting instruction outputting means for, when said judging means judges that the output of said motor is insufficient, outputting a boosting instruction for boosting the voltage of said mounted battery;

a boosting circuit for boosting the voltage of said mounted battery in response to the boosting instruction outputted by said boosting instruction outputting means;

detecting means for detecting that a voltage applied to said drive circuit becomes higher than a predetermined voltage; and a switching element for connecting said drive circuit and said mounted battery when said detecting means detects that the voltage applied to said drive circuit becomes higher than said predetermined voltage, wherein when the voltage applied to said drive circuit becomes higher than the predetermined voltage, a current is fed back from said drive circuit to said mounted battery.

* * * * *